(12) United States Patent
Laverick et al.

(10) Patent No.: US 7,650,230 B1
(45) Date of Patent: Jan. 19, 2010

(54) NAVIGATIONAL DEVICE FOR MOUNTING ON A SUPPORT PILLAR OF A VEHICLE AND A METHOD FOR DOING SAME

(75) Inventors: David J. Laverick, Overland Park, KS (US); Brian G. Schoenfish, Kansas City, KS (US)

(73) Assignee: Garmin Ltd. (KY)

( * ) Notice: Subject to any disclaimer, the term of this patent is extended or adjusted under 35 U.S.C. 154(b) by 307 days.

(21) Appl. No.: 10/663,045

(22) Filed: Sep. 13, 2003

Related U.S. Application Data

(63) Continuation-in-part of application No. 10/411,821, filed on Apr. 11, 2003, which is a continuation-in-part of application No. 10/397,662, filed on Mar. 26, 2003.

(51) Int. Cl.
 *H05K 5/02* (2006.01)
 *G01C 21/00* (2006.01)

(52) U.S. Cl. .................. 701/200; 361/679; 455/345; 455/348; 455/350

(58) Field of Classification Search ......... 701/200–214; 296/37.8, 37.13; 307/9.1, 10.1, 10.2; 340/426.34; 455/344–346, 348, 350; 361/679, 681, 683, 361/686
See application file for complete search history.

(56) References Cited

U.S. PATENT DOCUMENTS

| | | | | |
|---|---|---|---|---|
| 2,883,234 | A | | 4/1959 | Biondo ................. 696/37.9 |
| 3,946,826 | A | * | 3/1976 | Guhl et al. ............... 180/90 |
| 4,105,246 | A | | 8/1978 | Trumbull ................. 296/97.7 |
| 4,194,585 | A | | 3/1980 | Prince ..................... 180/90 |

(Continued)

FOREIGN PATENT DOCUMENTS

DE 3820510 12/1989

(Continued)

OTHER PUBLICATIONS

Meade Instruments Corporation—Meade? Optional Accessories for Meade? Courtesy of Wayback Machine, updated Nov. 9, 2000. http://web.archive.org/web/20001109112200/www.meade.com/catalog/meade_etx/accessories_etx.htm Downloaded: Jan. 18, 2008 7:35:16 AM.*

(Continued)

*Primary Examiner*—Eric Bolda
*Assistant Examiner*—Ari M Diacou
(74) *Attorney, Agent, or Firm*—Samuel M. Korte

(57) ABSTRACT

A navigation assembly (177k) for mounting a conventional, portable navigational device (10k) in a vehicle not originally equipped with navigational capabilities is provided. The navigation assembly (177k) comprises the navigational device (10k) and a mounting assembly (194k). Trim (196k) covering a support pillar (98k) of the vehicle and installed during manufacture of the vehicle is replaced with substantially similar trim (196k) having the mounting assembly (194k) mounted thereto or integrally formed therewith. The mounting assembly (194k) comprises a base (198k), a docking station (200k), and a retractable face plate (202k). The base (198k) of the mounting assembly (194k) is secured to the trim (196k) and includes a cut-out (204k) in which the docking station (200k) may be mounted. The docking station (200k) also includes a cut-out (208k) sized and configured to receive the navigational device (10k). The retractable face plate (202k) covers the cut-out (208k) in the docking station (200k) and is retracted in the rearward position when the navigational device (10k) is mounted in the docking station (200k) and is retracted in the forward position when the navigational device (10k) is not mounted in the docking station (200k).

11 Claims, 11 Drawing Sheets

U.S. PATENT DOCUMENTS

| | | | | |
|---|---|---|---|---|
| 4,552,399 | A | | 11/1985 | Atarashi .................. 296/37.12 |
| 4,619,386 | A | | 10/1986 | Richardson ................. 224/277 |
| 4,694,583 | A | | 9/1987 | Blaney ........................ 33/361 |
| 4,793,648 | A | | 12/1988 | Zerilli ..................... 296/37.12 |
| 4,946,120 | A | | 8/1990 | Hatcher ...................... 248/832 |
| 5,020,845 | A | | 6/1991 | Falcoff et al. .............. 296/37.7 |
| 5,102,181 | A | | 4/1992 | Pinkney .................... 296/37.12 |
| 5,198,831 | A | | 3/1993 | Burrell et al. ............... 343/895 |
| 5,265,929 | A | | 11/1993 | Pelham ..................... 296/97.6 |
| 5,364,159 | A | | 11/1994 | Kelman et al. ............. 296/192 |
| 5,383,138 | A | | 1/1995 | Motoyama et al. .......... 361/683 |
| 5,415,554 | A | * | 5/1995 | Kempkers et al. ............. 439/34 |
| D366,220 | S | * | 1/1996 | Sakamoto .................... D10/65 |
| 5,576,687 | A | | 11/1996 | Blank et al. ................ 340/438 |
| 5,626,320 | A | * | 5/1997 | Burrell et al. ............. 248/230.6 |
| 5,812,369 | A | | 9/1998 | Hsu et al. ................... 361/683 |
| 5,859,628 | A | | 1/1999 | Ross et al. |
| 5,859,762 | A | | 1/1999 | Clark et al. ................. 361/686 |
| 5,865,403 | A | * | 2/1999 | Covell ........................ 248/27.1 |
| D409,927 | S | | 5/1999 | Wiegers et al. ............. D10/65 |
| 5,910,882 | A | * | 6/1999 | Burrell ...................... 361/681 |
| 5,917,435 | A | | 6/1999 | Kamiya et al. |
| D417,201 | S | * | 11/1999 | Davis ....................... D14/343 |
| 5,996,866 | A | * | 12/1999 | Susko et al. ................. 224/281 |
| 6,086,129 | A | | 7/2000 | Gray ........................ 296/37.8 |
| 6,094,341 | A | | 7/2000 | Lin ............................ 361/681 |
| 6,095,470 | A | * | 8/2000 | Kalis ...................... 248/309.1 |
| 6,097,448 | A | | 8/2000 | Perkins ..................... 348/837 |
| 6,102,284 | A | * | 8/2000 | Myers et al. ................. 235/375 |
| 6,111,964 | A | * | 8/2000 | Ishibashi ..................... 381/86 |
| 6,125,030 | A | * | 9/2000 | Mola et al. .................. 361/681 |
| 6,130,727 | A | | 10/2000 | Toyozumi ................... 348/837 |
| 6,140,933 | A | * | 10/2000 | Bugno et al. ............. 340/693.5 |
| 6,165,002 | A | * | 12/2000 | Kalis ......................... 439/358 |
| 6,169,955 | B1 | | 1/2001 | Fultz ......................... 701/200 |
| 6,173,933 | B1 | * | 1/2001 | Whiteside et al. ......... 248/276.1 |
| 6,182,006 | B1 | | 1/2001 | Meek ........................ 701/200 |
| D438,841 | S | | 3/2001 | Smith ........................ D12/424 |
| 6,267,428 | B1 | * | 7/2001 | Baldas et al. ............... 296/37.7 |
| 6,273,310 | B1 | | 8/2001 | Gregory ..................... 244/275 |
| 6,295,038 | B1 | | 9/2001 | Rebeske ..................... 345/1.1 |
| 6,338,517 | B1 | * | 1/2002 | Canni et al. ................ 296/37.8 |
| D453,300 | S | | 2/2002 | Schoenfish et al. .......... D10/65 |
| D453,477 | S | | 2/2002 | Schoenfish et al. .......... D10/65 |
| 6,345,179 | B1 | * | 2/2002 | Wiegers et al. ............. 455/344 |
| 6,370,037 | B1 | * | 4/2002 | Schoenfish .................. 361/807 |
| 6,370,741 | B1 | | 4/2002 | Lu ............................. 24/523 |
| D457,445 | S | | 5/2002 | Schoenfish .................. D10/65 |
| 6,386,965 | B1 | | 5/2002 | Greenwald et al. ........... 454/75 |
| 6,392,877 | B1 | | 5/2002 | Iredale ....................... 361/683 |
| D459,249 | S | | 6/2002 | Schoenfish et al. .......... D10/65 |
| 6,409,242 | B1 | | 6/2002 | Chang |
| 6,411,502 | B1 | * | 6/2002 | Burrell ....................... 361/681 |
| 6,412,848 | B1 | | 7/2002 | Ceccanese et al. .......... 296/37.7 |
| 6,427,959 | B1 | * | 8/2002 | Kalis et al. ............... 248/288.11 |
| 6,428,072 | B1 | | 8/2002 | Moore ..................... 396/24.34 |
| 6,464,185 | B1 | * | 10/2002 | Minelli et al. ............. 248/183.1 |
| 6,477,391 | B1 | | 11/2002 | Muramatsu et al. |
| 6,482,082 | B1 | | 11/2002 | Derleth et al. ............... 454/156 |
| 6,493,915 | B2 | | 12/2002 | Zonneveld et al. ......... 29/401.1 |
| 6,505,121 | B1 | | 1/2003 | Russell |
| 6,529,381 | B1 | * | 3/2003 | Schoenfish .................. 361/725 |
| 6,633,347 | B2 | | 10/2003 | Kitazawa ................... 348/837 |
| 6,636,918 | B1 | | 10/2003 | Aguilar et al. .............. 710/303 |
| 6,650,884 | B1 | * | 11/2003 | Wiegers et al. ............. 455/344 |
| 6,663,064 | B1 | * | 12/2003 | Minelli et al. ............. 248/205.5 |
| 6,681,176 | B2 | * | 1/2004 | Funk et al. .................. 701/207 |
| 6,709,041 | B1 | | 3/2004 | Hotary et al. ................ 296/70 |
| 6,758,510 | B1 | | 7/2004 | Starling |
| 6,810,735 | B2 | | 11/2004 | Kaneko et al. ................ 73/493 |
| 6,827,284 | B2 | * | 12/2004 | Ichishi et al. ............... 236/49.3 |
| 6,928,366 | B2 | * | 8/2005 | Ockerse et al. .............. 701/224 |
| D509,760 | S | * | 9/2005 | Burrell et al. ................ D10/65 |
| 6,955,279 | B1 | * | 10/2005 | Mudd et al. ................. 224/197 |
| 6,966,533 | B1 | * | 11/2005 | Kalis et al. ............... 248/316.4 |
| 6,976,916 | B2 | * | 12/2005 | Burrell et al. .................. 463/1 |
| D531,920 | S | * | 11/2006 | Mudd et al. ................. D10/65 |
| 7,142,980 | B1 | * | 11/2006 | Laverick et al. ............. 701/213 |
| 7,154,383 | B2 | | 12/2006 | Berquist .................. 340/425.5 |
| 7,313,477 | B1 | | 12/2007 | Laverick et al. ............. 701/213 |
| 2001/0040109 | A1 | | 11/2001 | Yaski et al. |
| 2001/0042990 | A1 | | 11/2001 | Ito et al. ....................... 296/70 |
| 2001/0047899 | A1 | | 12/2001 | Ikeda .......................... 180/90 |
| 2002/0003354 | A1 | | 1/2002 | Inoue et al. ................... 296/70 |
| 2002/0044411 | A1 | | 4/2002 | Iredale ....................... 361/683 |
| 2002/0075136 | A1 | | 6/2002 | Nakaji et al. ............. 340/425.5 |
| 2002/0085129 | A1 | | 7/2002 | Kitazawa ................... 348/837 |
| 2002/0113451 | A1 | | 8/2002 | Chang |
| 2002/0133276 | A1 | | 9/2002 | Onodera ...................... 701/36 |
| 2002/0138180 | A1 | | 9/2002 | Hessing et al. |
| 2002/0149708 | A1 | | 10/2002 | Nagata et al. ............... 348/837 |
| 2002/0152027 | A1 | | 10/2002 | Allen ......................... 701/213 |
| 2002/0163219 | A1 | * | 11/2002 | Clark et al. ................ 296/37.8 |
| 2002/0183921 | A1 | | 12/2002 | Sugiyama et al. ........... 701/200 |
| 2003/0055556 | A1 | | 3/2003 | Hashida |
| 2003/0090371 | A1 | * | 5/2003 | Teowee et al. .......... 340/426.24 |
| 2003/0127878 | A1 | * | 7/2003 | Gort et al. .................. 296/37.8 |
| 2003/0137543 | A1 | | 7/2003 | Anderson |
| 2003/0151664 | A1 | | 8/2003 | Wakimoto et al. ........... 348/148 |
| 2003/0168875 | A1 | | 9/2003 | Anderson et al. |
| 2003/0184111 | A1 | | 10/2003 | Sturt |
| 2003/0188103 | A1 | * | 10/2003 | Edwards et al. ............. 711/115 |
| 2003/0208314 | A1 | | 11/2003 | Funk |
| 2003/0214474 | A1 | | 11/2003 | Aoki et al. .................... 345/87 |
| 2004/0024522 | A1 | | 2/2004 | Walker et al. ............... 710/210 |
| 2004/0026947 | A1 | | 2/2004 | Kitano et al. |
| 2004/0041499 | A1 | * | 3/2004 | Donovan et al. ............. 312/248 |
| 2004/0196179 | A1 | * | 10/2004 | Turnbull ................. 342/357.06 |
| 2004/0204840 | A1 | | 10/2004 | Hashima et al. ............. 701/209 |
| 2004/0206796 | A1 | | 10/2004 | Badillo et al. |
| 2005/0023899 | A1 | | 2/2005 | Kitazawa ................... 307/10.1 |
| 2005/0177350 | A1 | | 8/2005 | Kishikawa ..................... 703/1 |
| 2005/0209852 | A1 | | 9/2005 | Beckert et al. ............... 704/246 |
| 2007/0247800 | A1 | | 10/2007 | Smith et al. ................. 361/683 |
| 2007/0265769 | A1 | | 11/2007 | Geelen et al. ............... 701/200 |
| 2007/0279856 | A1 | | 12/2007 | Bragg ........................ 361/683 |

FOREIGN PATENT DOCUMENTS

| | | |
|---|---|---|
| GB | 2405049 | 8/2003 |
| JP | 8-230104 | 8/1994 |
| JP | 9-224202 | 8/1997 |
| JP | 9-309389 | 12/1997 |

OTHER PUBLICATIONS

Garmin 010-10314-00 Carry case. Evidence of public use or sale given by advertisement on Amazon.com. Date first available at Amazon.com: Oct. 2, 2001. http://www.amazon.com/gp/product/B00004VX39/ref=pd_cp_e_title/002-6032276-8003210.

A GPS III Owner's Manual & Reference Guide, Garmin Corporation, 1998.

A GPSMAP 130 Owner's Manual and Reference, Garmin International, 1998.

Office Action dated Jan. 23, 2008 from U.S. Appl. No. 10/397,662, filed Mar. 26, 2003.

Office Action dated Jan. 28, 2008 from U.S. Appl. No. 10/790,382, filed Mar. 1, 2004.

Office Action dated Mar. 17, 2008 from U.S. Appl. No. 11/682,062, filed Mar. 5, 2007.

* cited by examiner

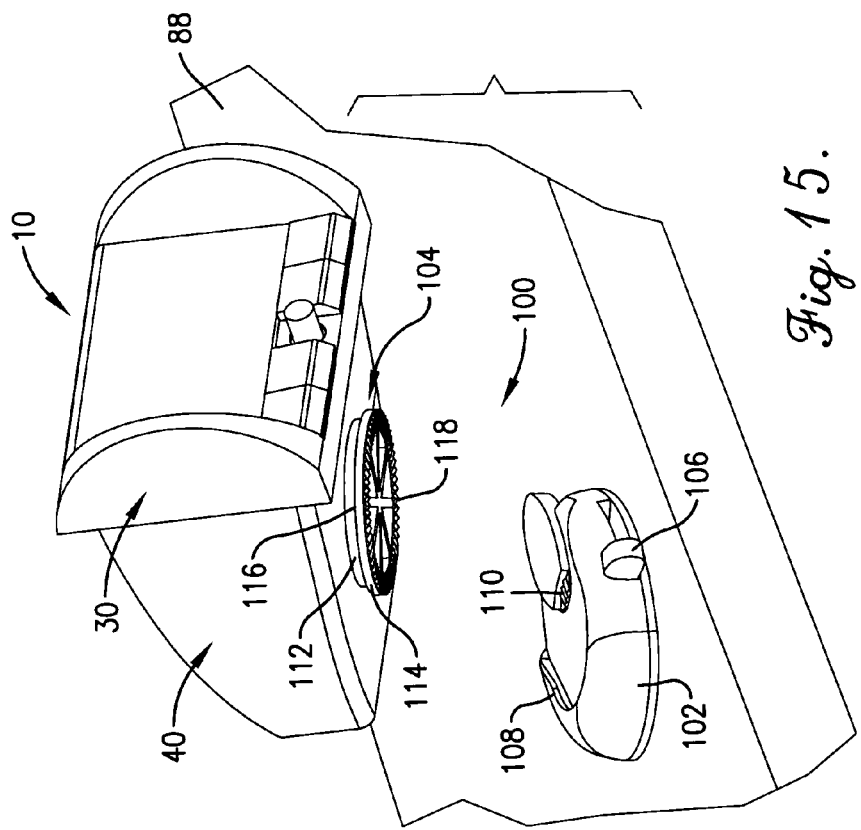
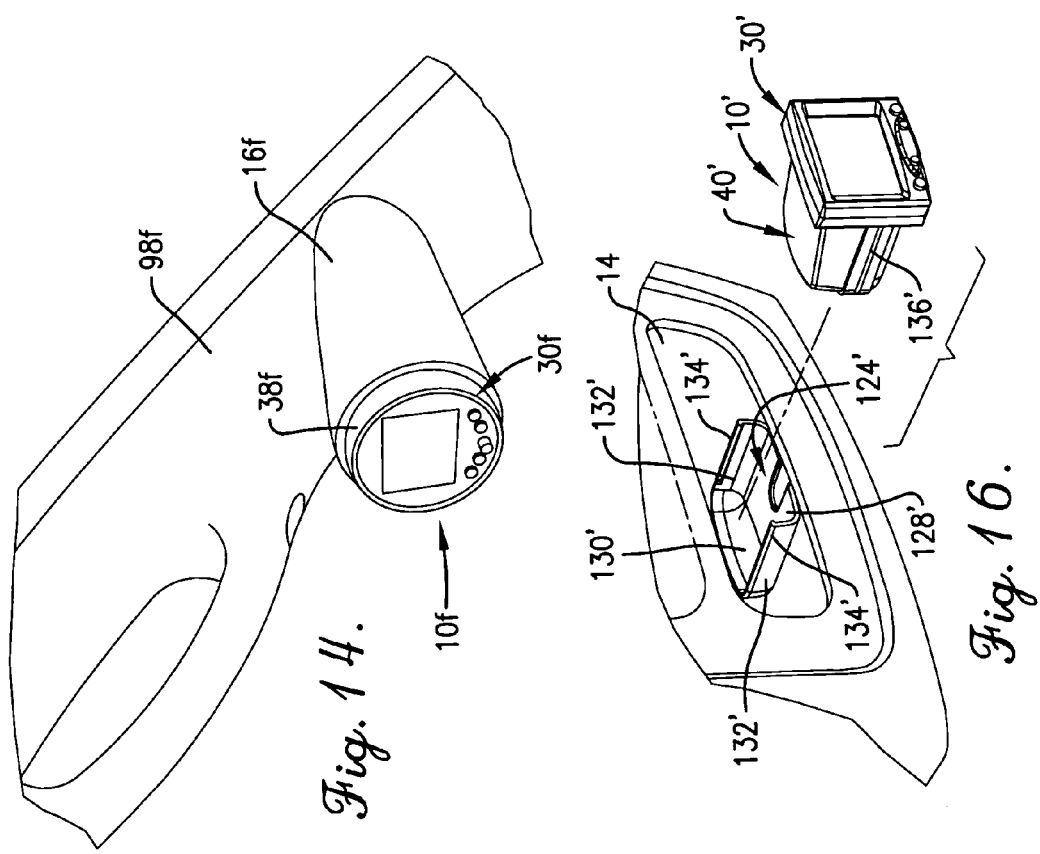

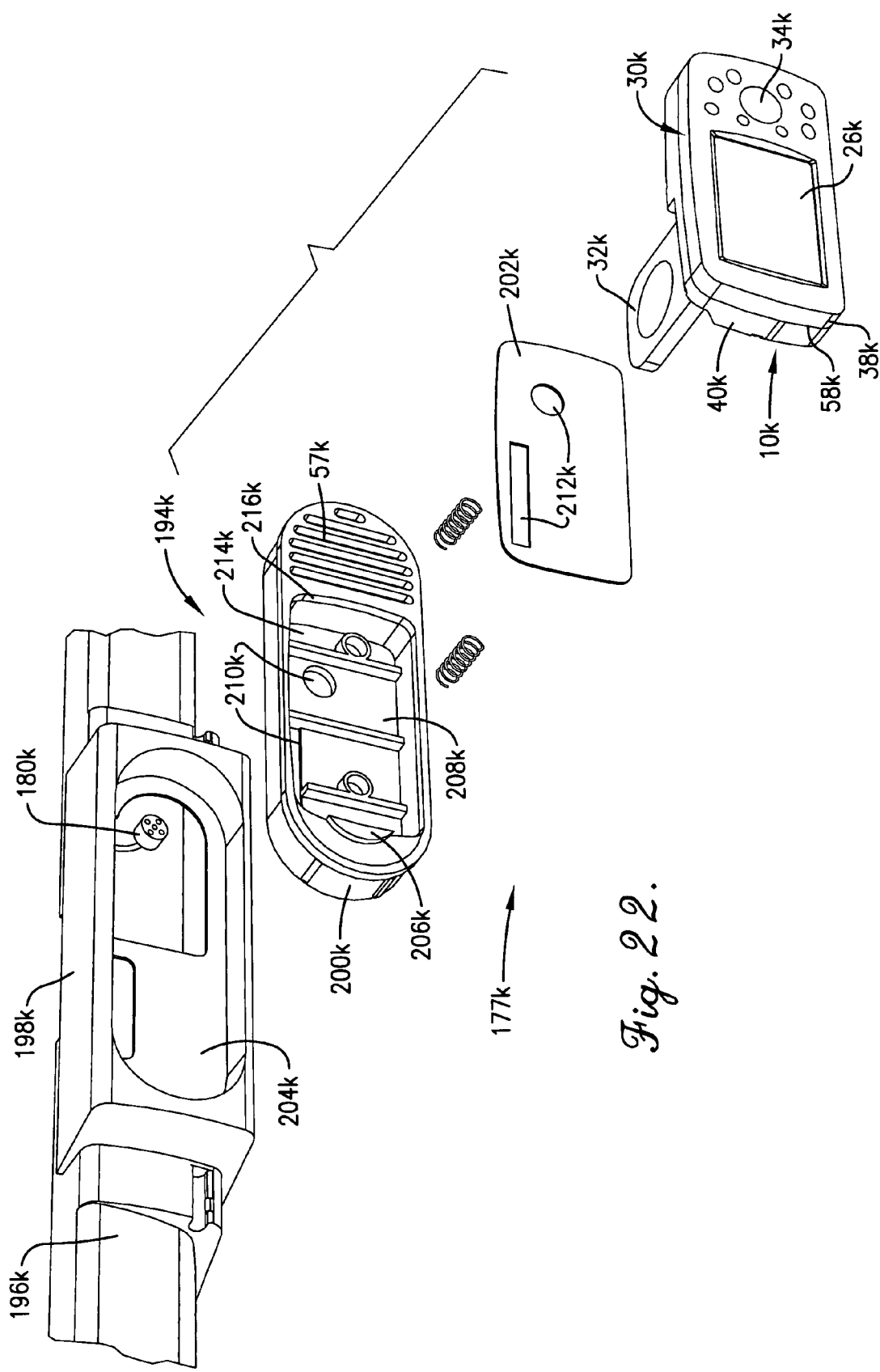

NAVIGATIONAL DEVICE FOR MOUNTING ON A SUPPORT PILLAR OF A VEHICLE AND A METHOD FOR DOING SAME

RELATED APPLICATIONS

The present application is a continuation-in-part and claims priority benefit, with regard to all common subject matter, of U.S. application Ser. No. 10/411,821, filed Apr. 11, 2003, and titled "A NAVIGATIONAL DEVICE FOR INSTALLATION IN A VEHICLE AND A METHOD FOR DOING SAME," which is a continuation-in-part of U.S. application Ser. No. 10/397,662, filed Mar. 26, 2003, and titled "A NAVIGATIONAL DEVICE FOR INSTALLATION IN A VEHICLE AND A METHOD FOR DOING SAME." This application is also co-pending with U.S. Application Ser. No. 10/663,044, being filed concurrently on Sep. 13, 2003, and titled "A NAVIGATIONAL DEVICE FOR INSTALLATION IN A VEHICLE AND A METHOD FOR DOING SAME." All of the above-identified earlier-filed and co-pending applications are hereby incorporated by reference into the present application.

BACKGROUND OF THE INVENTION

1. Field of the Invention

The present invention relates to navigational devices. More particularly, the invention relates to navigational devices for use in vehicles not originally equipped with nor designed for a navigational device.

2. Description of the Prior Art

Navigational devices, such as global positioning satellite ("GPS") units, are becoming increasingly popular options in automobiles and other vehicles. Such navigational devices can determine a vehicle's current location, display a city map or other driving area, and provide directions.

Many luxury vehicles are now either originally equipped with navigational devices or are designed to accept original equipment manufacture ("OEM") navigational devices as a dealer option. However, the popularity of navigational devices has spread beyond those who can afford luxury vehicles. Unfortunately, vehicle manufacturers have been slow to add factory or dealer-installed navigational devices to lower-priced vehicles, because it often takes three to six years to implement a design change in a vehicle model. Also, since implementing such a design change can be extremely expensive, it has been thus far impractical and too expensive to equip many vehicles with OEM navigational devices.

Those wishing to use a navigational device in a vehicle that is not equipped with nor configured to receive such a device often choose to use a portable, hand-held navigational device. One such navigational device is sold by Garmin International, Inc., under the trade name ETREX. These navigational devices are usually intended to be used in a multiplicity of locations, one of which may be the vehicle. However, because these navigational devices are not specially designed for use in vehicles, users are forced to store the navigational devices in a glove compartment, a vehicle console, an empty passenger seat, or on a dashboard. Each of these locations presents accessibility and viewing problems. For example, if the navigational device is tossed onto the dashboard of the vehicle, it can slide around, causing damage to the device and the vehicle. Additionally, use of the device requires a user to hold it in one hand and drive with the other hand, clearly causing safety concerns and problems. Furthermore, the portable navigational device may become lost in the many open spaces and cracks of the vehicle.

Mounts have been designed to attach handheld navigational devices to vehicle dashboards to alleviate some of these problems. However, such mounts often obstruct the view of the driver and/or passenger of the vehicle. Additionally, the mounts clutter the dashboard of the vehicle and are not aesthetically pleasing. Further, mounts permanently installed on the dashboard leave holes and other scarring marks. If the mount is removably installed on the dashboard, it often becomes loose due to the vibrations of the vehicle.

Accordingly, there is a need for an improved navigational device that overcomes the limitations of the prior art. More particularly, there is a need for a navigational device that can be used in a vehicle not originally equipped with a navigational device without need for a dashboard mount. Additionally, there is a need for a navigational device that is easily accessible and viewable by a driver of the vehicle.

SUMMARY OF THE INVENTION

The present invention solves the above-described problems and provides a distinct advance in the art of navigational devices. More particularly, the present invention provides a navigational device that may be removably or permanently mounted in a vehicle not designed to receive a navigational device, without requiring use of a dashboard mount.

The navigational device of the present invention broadly includes a navigation component such as a global positioning satellite ("GPS") receiver; a processor coupled with the navigation component; a memory coupled with the processor; a display; an input; and a housing for housing the navigation component, the processor, and the memory. In some embodiments, the housing is importantly sized and configured to be removably mounted in an open port or existing opening of a vehicle. Due to the many different makes and models of vehicles, the housing of the navigational device consequently embodies a plurality of sizes and shapes.

In other embodiments, the navigational device is a conventional, portable navigational device and thus, is not particularly sized and configured to fit within an existing location in the vehicle.

In a first preferred embodiment of the present invention, the open port results from removal of a non-navigational component in an overhead console of the vehicle. The overhead console may be any standard overhead console formed during manufacture of the vehicle and positioned on an interior roof section of the vehicle. The overhead console houses at least one non-navigational component, such as a display screen displaying an outside temperature and bearing of the vehicle. The non-navigational component is removed from the overhead console, leaving the open port. The navigational device, which is sized and configured to the dimensions of the open port, is then mounted or installed in the open port.

Alternatively, the overhead console itself may be removed from the vehicle, leaving an open area. A replacement overhead console sized and configured to fit within the open area resulting from removal of the first original overhead console is then installed in the open area. The replacement overhead console is substantially the same size and shape as the overhead console and includes the navigational device.

In a second preferred embodiment, an open port results from removal of an air vent unit installed in the vehicle. Similar to the first preferred embodiment, a navigational device is sized and configured to the dimensions of the open port. The housing of this embodiment is provided with insulation to protect the navigational device from excessive temperatures created by the vehicle's heating and cooling system. Further, an air grate or vent may be provided around a front face of the housing to minimize potential air flow noise resulting from removal of the air vent unit.

In a third preferred embodiment, an open port results from removal of a non-navigational component in a middle console of the vehicle. The middle console is positioned directly under a dashboard of the vehicle and generally center of the vehicle. Similar to the first preferred embodiment, a navigational device is sized and configured to the dimensions of the open port, so it may replace the non-navigation component in the middle console.

In a fourth preferred embodiment, an open port results from removal of a non-navigational component in the dashboard of the vehicle. Similar to the first preferred embodiment, a navigational device is sized and configured to the dimensions of the open port, so it may replace the non-navigation component in the dashboard.

In a fifth preferred embodiment, an empty recess formed during manufacture of the vehicle is located. The empty recess may be, for example, a recess designed to hold objects such as eyeglasses, compact discs, a compact disc player, a garage door opener, or other miscellaneous articles. A navigational device, which is sized and configured to fit within the empty recess, is then mounted in the empty recess.

In a sixth preferred embodiment, a hollowed receptacle is secured on a pillar of a door frame of the vehicle. A navigational device, which is sized and configured to fit within the hollowed receptacle, is then mounted in the hollowed receptacle. Alternatively, the pillar is replaced with a substantially similar replacement pillar that includes the navigational device mounted in the hollowed receptacle.

Seventh and eighth preferred embodiments are disclosed in U.S. application Ser. No. 10/411,821, filed Apr. 11, 2003, and incorporated herein by reference. Ninth and tenth preferred embodiments are disclosed in U.S. application Ser. No. 10/633,044, filed Sep. 12, 2003, which is also incorporated herein by reference.

In an eleventh preferred embodiment, a navigation assembly for mounting a conventional, portable navigational device in a vehicle is provided. The navigation assembly comprises the navigational device and a mounting assembly. The mounting assembly is attached to or integrally formed with a trim piece that replaces trim or molding covering a support pillar of the vehicle above the vehicle's windshield.

The mounting assembly includes a base, a docking station, and a retractable face plate. The base is secured to or integrally formed with the new trim. The docking station is sized and configured to fit within the base, and the retractable face plate is sized to fit within and substantially close the opening of the docking station when the navigational device is removed therefrom. The docking station is further sized and configured to receive the navigational device.

The navigational device may be quickly and easily placed in the docking station for use in the vehicle and removed therefrom for use outside the vehicle. The navigational device may be self-contained or may receive power from and exchange data with the vehicle.

In each of these embodiments and other embodiments described herein, the navigational device may be permanently mounted in the open port, empty recess, or hollowed receptacle or removably mounted therein. Moreover, the navigational device may be provided with wires or adapters for connecting to the vehicle's power source and/or other electronic components in the vehicle, such as a display screen or vehicle computer. Alternatively, the navigational device may use wires or adapters of the removed non-navigational component to connect the navigational device to the power source or the other electronic components. Further, the navigational device may be provided with at least one battery for powering the navigational device.

By constructing the navigational device as described herein, numerous advantages are realized. For example, because the navigational device is sized and configured to replace a non-navigational component originally installed in a vehicle, it may be installed in any vehicle, regardless of whether the vehicle was designed to receive such a device. Moreover, the navigational device may be installed at any time, not just during manufacture of the vehicle or at the dealer when the vehicle is sold. Thus, a user of the vehicle need not purchase a luxury automobile to enjoy the benefits of a navigational device installed in the vehicle.

Further, the navigational device may be mounted or installed in the vehicle without replacing the dashboard or the middle console of the vehicle. Since replacing the dashboard or the middle console of the vehicle is clearly expensive, the present invention provides an inexpensive alternative to installing a navigational device in a vehicle.

Additionally, because the navigational device is designed to replace a component which was designed to be viewed and/or operated by a user, the navigational device will typically be positioned in an easily accessible and viewable area. This limits the unsafe practice of holding the navigational device while driving. Further, the navigational device and the vehicle are not harmed from the navigational device being tossed around within the vehicle.

Furthermore, because the housing of the navigational device is designed to match the dimensions of the open port, empty recess, or hollowed receptacle so as to fit substantially within the open port, empty recess, or hollowed receptacle, installation of the navigational device does not adversely affect the aesthetics of the vehicle.

The eleventh preferred embodiment provides particular advantages because it creates a space within the vehicle for mounting the navigational device. Unlike the prior embodiments, which require removal of a non-navigational component from a location within the vehicle and provide a navigational device sized and configured to particularly fit that location, the eleventh preferred embodiment permits the use of a conventionally, sized navigational device. Additionally, the location of the navigational device within the vehicle is easily viewed and accessed by a driver or passenger of the vehicle and complements the aesthetics of the vehicle.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein:

FIG. 2b is a fragmentary isometric view of a replacement overhead console including the navigational device, particularly illustrating the replacement console having substantially the same size and shape as the overhead console of FIG. 1a;

FIG. 14 is a fragmentary isometric view of the sixth preferred embodiment of the present invention illustrating a navigational device mounted within a hollowed receptacle secured on a pillar of a door frame of the vehicle;

FIG. 15 is an isometric view depicting the navigational device of FIG. 6 being removably mounted on the dashboard of the vehicle, particularly illustrating a second mounting unit for removably mounting the navigational device on the dashboard;

FIG. 16 is an exploded fragmentary view of the navigational device of FIGS. 11 and 12 mounted in an open port, particularly illustrating the navigational device removably mounted within the open port via a cradle;

Figure 12:
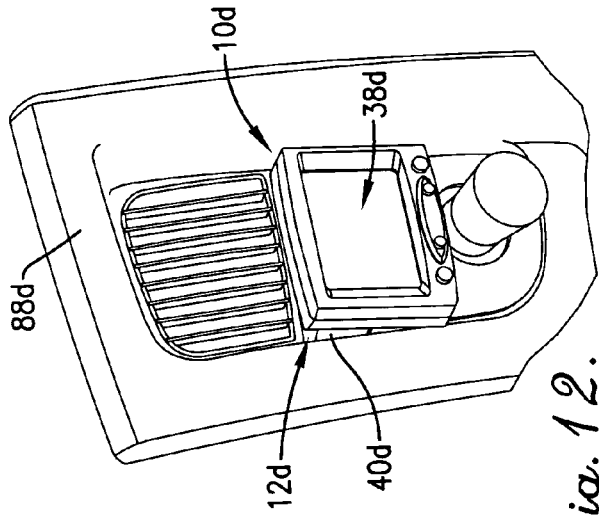
FIG. 12 is a fragmentary isometric view of the navigational device of FIG. 11 shown removably mounted within the open port.
Figure 11:
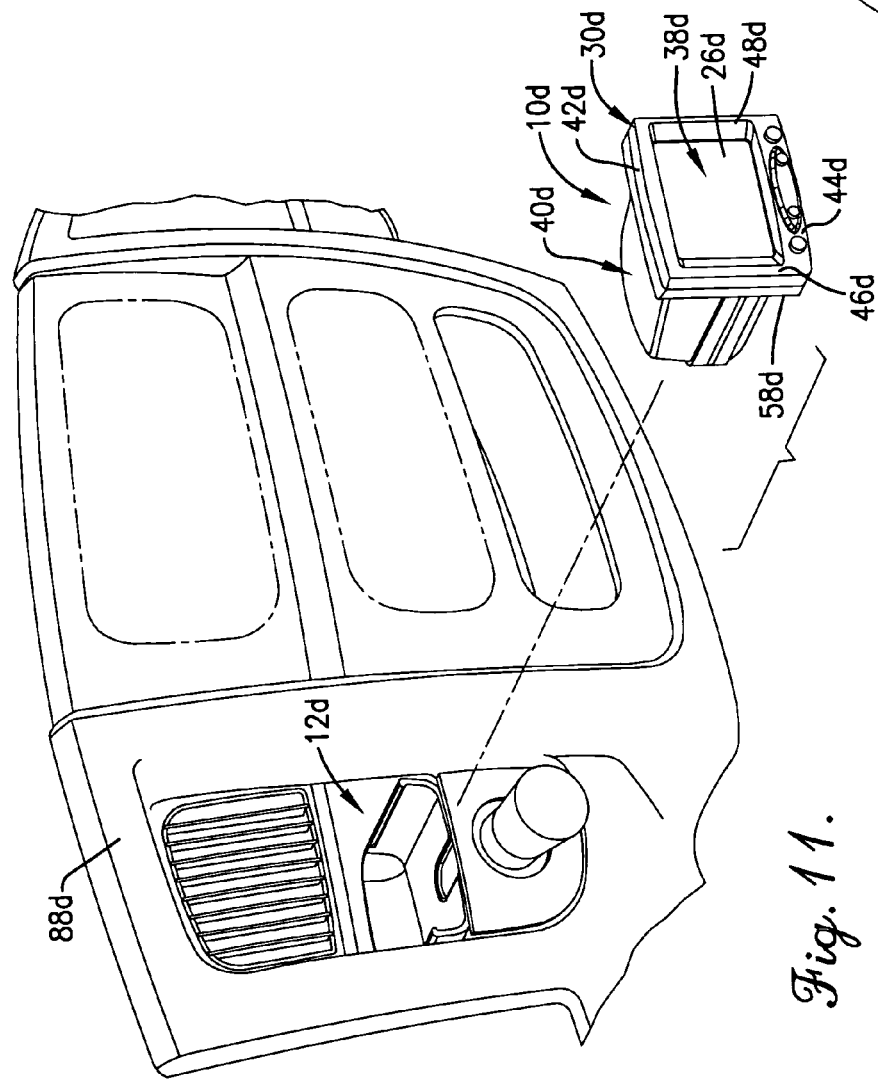
FIG. 11 is an exploded fragmentary isometric view of the fourth preferred embodiment of the present invention illustrating a navigational device installed in an open port resulting from removal of a non-navigational component in a dashboard of the vehicle, particularly illustrating the navigational device adapted to be removably mounted in the open port via a cradle.
Figure 18:
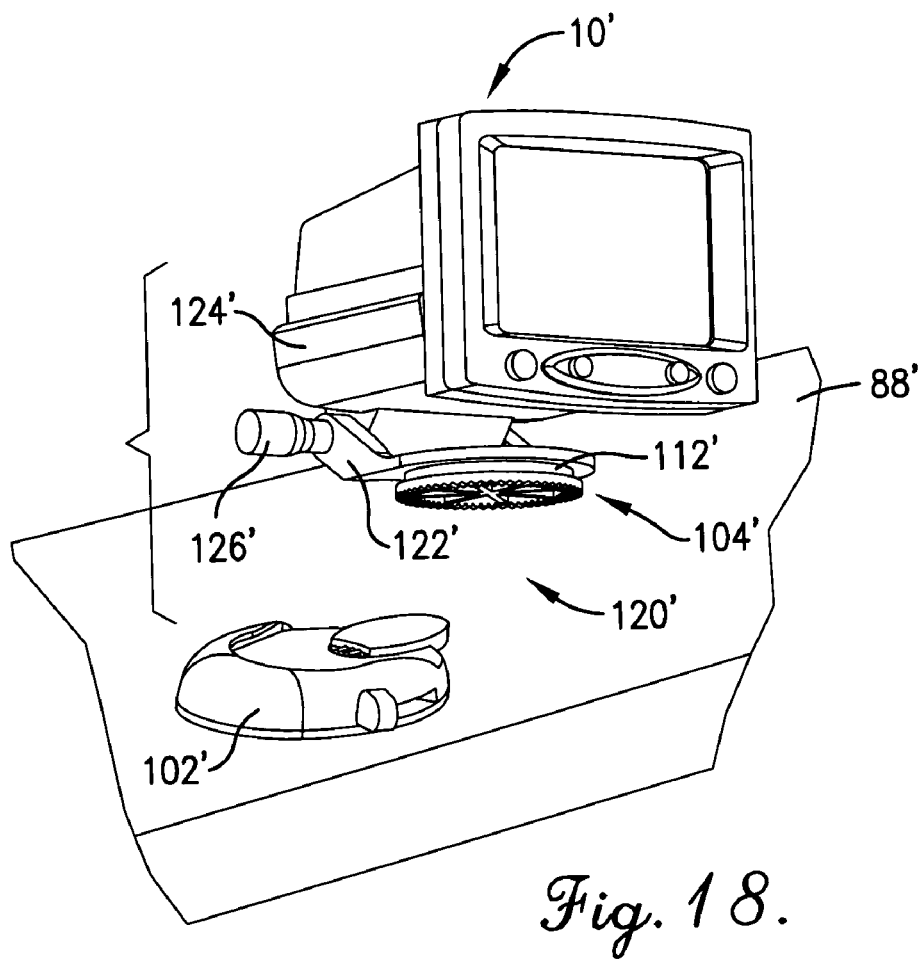
Figure 19:
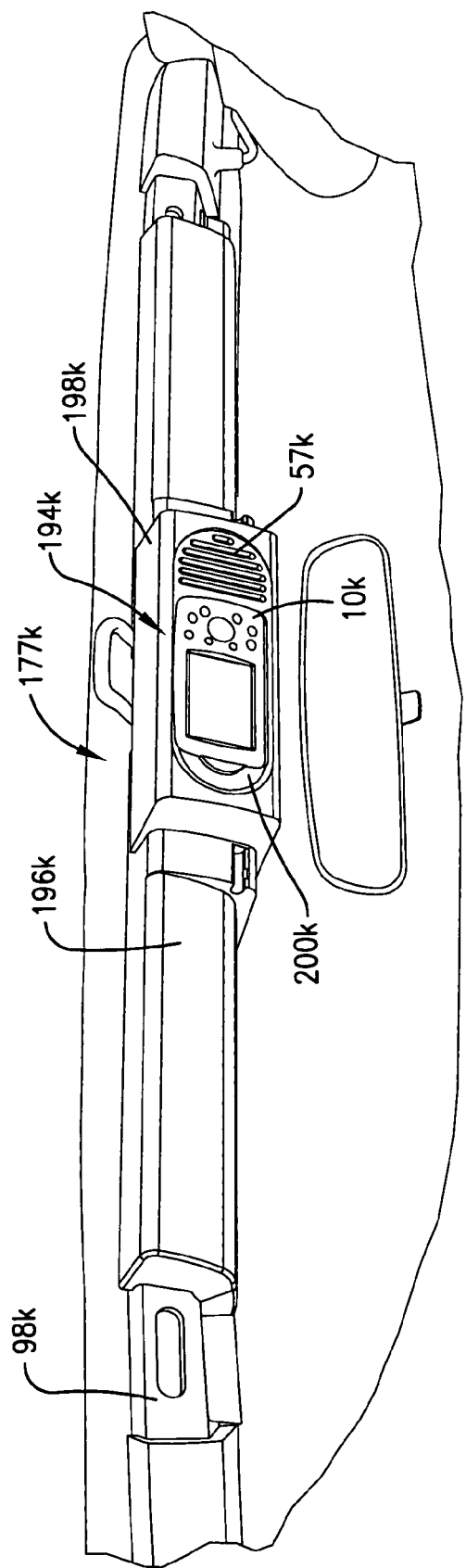
Figure 20:
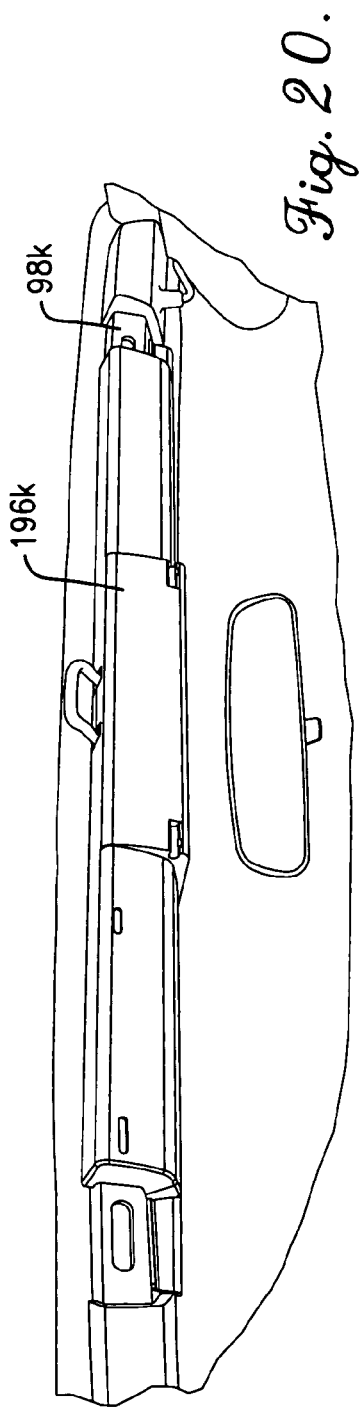
Figure 21:
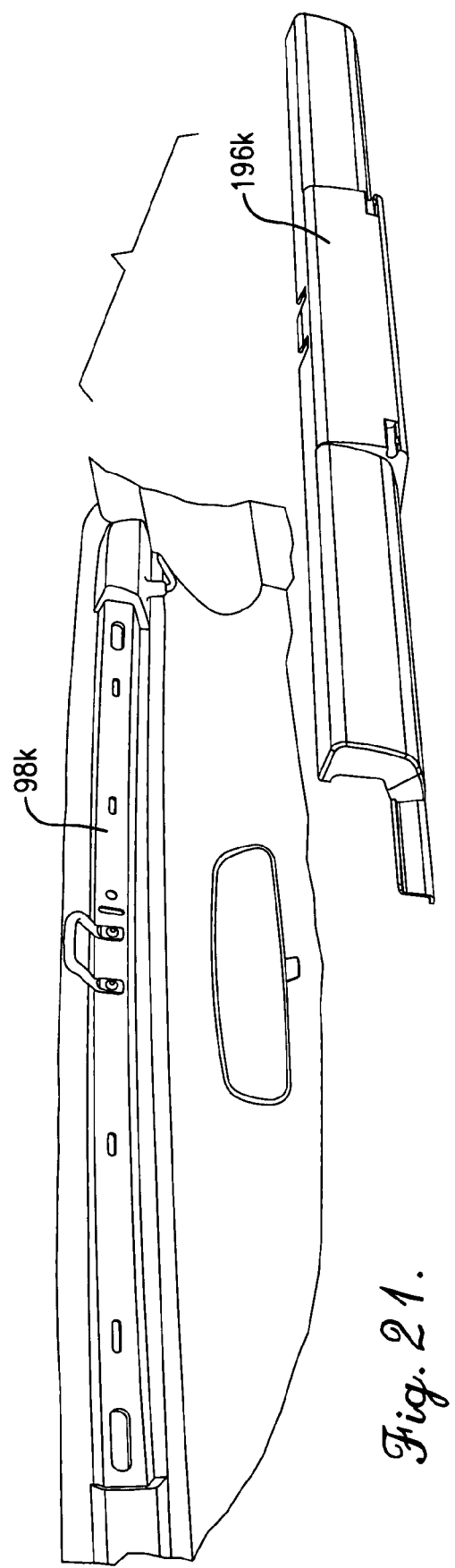

FIG. 18 is an exploded fragmentary isometric view of the navigational device of FIGS. 11 and 12, particularly illustrating a third mounting unit substantially similar to the second mounting unit of FIG. 15 but for the cradle, wherein the navigational device is adapted to be removably mounted on the dashboard of the vehicle via the cradle, such that the navigational device may be removably mounted within the open port illustrated in FIG. 11, the hollowed receptacle illustrated in FIG. 14, and on the dashboard of the vehicle;

FIG. 19 is a fragmentary isometric view of a navigation assembly constructed in accordance with an eleventh preferred embodiment of the present invention and shown mounted on trim covering a support pillar of the vehicle;

FIG. 20 is a fragmentary isometric view of the trim of the eleventh embodiment illustrated in FIG. 19, wherein the trim is covering the support pillar of the vehicle;

FIG. 21 is a fragmentary exploded isometric view of the trim and support pillar of FIG. 20; and FIG. 22 is an exploded isometric view of the navigation assembly illustrated in accordance with the eleventh preferred embodiment, particularly illustrating a base, a docking station, and a retractable face plate of the mounting assembly and a navigational device.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Turning now to the drawing figures, a navigational device 10 constructed in accordance with several preferred embodiments of the present invention is illustrated. In some embodiments, the navigational device 10 is provided for insertion or mounting in an open port 12, an empty recess 14, or a hollowed receptacle 16 of a vehicle. The open port 12 results from removal of a non-navigational component 18 installed in the vehicle during manufacture or dealer preparation of the vehicle. The empty recess 14 was formed during manufacture of the vehicle and is designed to hold objects such as eyeglasses, compact discs, a compact disc player, a garage door opener, or other miscellaneous articles. The hollowed receptacle 16 is mounted within the vehicle, and the navigational device is mounted within the receptacle.

In other embodiments, the navigational device 10 is configured for mounting in a mounting apparatus secured to trim covering a pillar of the vehicle and therefore, does not require removal of a non-navigation component. In these embodiments, the navigational device 10 is preferably a conventional, portable device 10 and is not specially sized or configured to mount within an existing location in the vehicle.

The navigational device 10 is thus uniquely suited for installation in a vehicle which does not originally contain nor is designed to receive a navigational device. Examples of vehicles in which the navigational device 10 may be installed include automobiles, motorcycles, boats, airplanes, and other transportation machines for moving persons or cargo.

Figure 1:
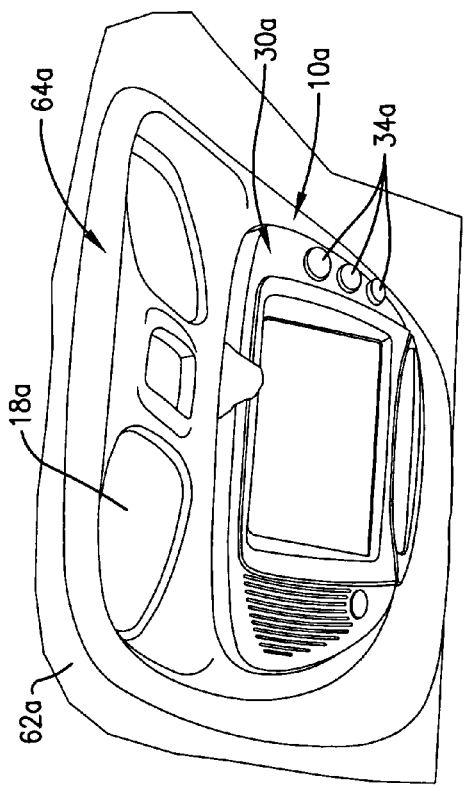
FIG. 1 is a block diagram of the components of a navigational device constructed in accordance with a first, second, third, fourth, fifth, sixth, seventh, eighth, ninth, tenth, and eleventh preferred embodiment of the present invention.

As illustrated in FIG. 1, the navigational device 10 broadly comprises a navigation component 20; a processor 22 coupled with the navigation component 20; a memory 24 coupled with the processor 22; a display 26; an input 28; and a housing 30 for housing the navigation component 20, the processor 22, and the memory 24.

The navigation component 20 is preferably a global positioning satellite ("GPS") receiver, although other navigation components may be used. The preferred navigation component 20 is operable to receive satellite signals from a plurality of satellites using a GPS antenna 32, such as a GPS patch antenna 32, which is electronically coupled with the navigation component 20. The navigation component 20 is electronically coupled with the processor 22, and the processor 22 is operable to calculate a location of the navigational device 10 as a function of the satellite signals.

The memory 24 is preferably coupled with the processor 22 but may instead be coupled with a processor (not shown) of the vehicle. Cartographic data is preferably stored in the memory 24 and operable to be accessed by the processor 22 for viewing on the display 26 of the navigational device 10. The input 28 allows for control of the processor 22 using a plurality of control buttons 34, as illustrated in FIG. 2b. The control buttons 34 may be used to operate drop-down menus to select and input names or other identifiers. Alternatively, the input 28 may be an alphanumeric keypad (not shown), such as a telephone keypad, which may be used to type in names, identifiers, and text, or the input 28 may be a touch screen (not shown).

The housing 30 may be formed of plastic, fiberglass, or any other suitable material. Importantly, the housing 30 is sized and configured to mount within the open port 12, the empty recess 14, or the hollowed receptacle 16. Since the present invention may be used in a plurality of different types of vehicles, the open port 12, empty recess 14, and hollowed receptacle's 16 shape and size will be unique to the make and model of the vehicle. Thus, various navigational devices 10 of differing sizes and configuration are embodied in the present invention and will be described below.

Figure 2A:
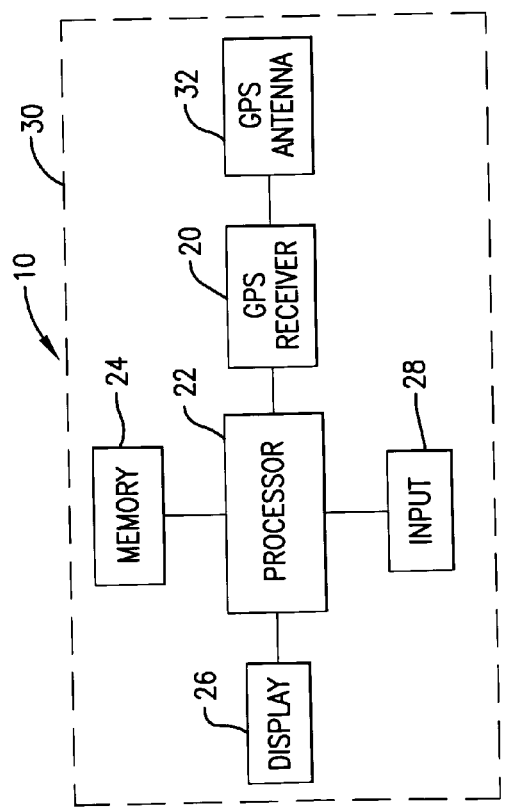
FIG. 2a is an exploded fragmentary isometric view of the first preferred embodiment of the present invention illustrating a non-navigational component housed in an open port of an overhead console and a navigational device sized and configured to be mounted within the open port.
Figure 2B:
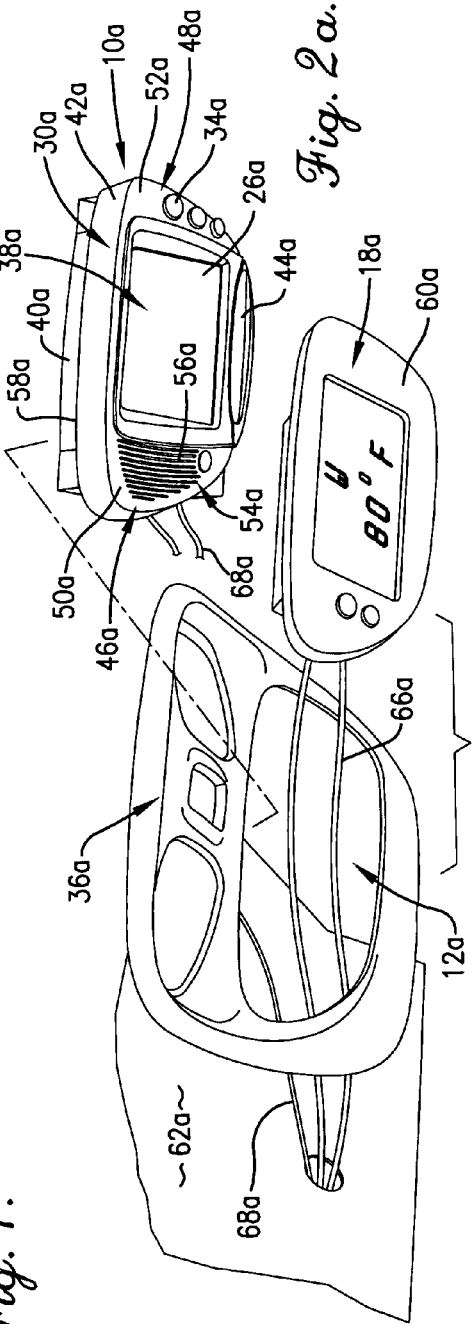
Figure 3:
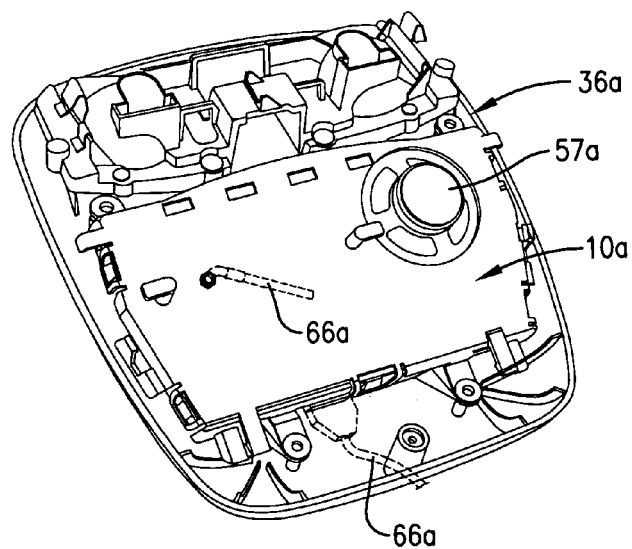
FIG. 3 is a rear isometric view of the overhead console of FIG. 1a illustrating the navigational device and the wires of the removed non-navigational component in broken line.

FIGS. 2a, 2b, 3, 4, and 5 illustrate a navigational device 10a constructed in accordance with a first preferred embodiment, which includes a housing 30a sized and configured to fit within an open port 12a resulting from removal of a non-navigational component 18a from an overhead console 36a of a vehicle. The non-navigational component 18a may be, for example, a light, an information display, an air vent unit, a clock, a compass, or a holder for holding eyeglasses, a garage door opener, or other miscellaneous articles. The housing 30a includes a front, frame-shaped section 38a and an attached rear, box-shaped section 40a. The front section 38a includes upper and lower walls 42a,44a and left and right side walls 46a,48a, which together define an enclosed area for receiving a display 26a. Control buttons 34a may be positioned on front faces 50a,52a of the left and right side walls 46a,48a, as depicted in FIG. 2a, or anywhere else on the housing 30a. The front face 50a of the left side wall 46a also preferably includes a series of longitudinal slots 54a which define a grill 56a, as illustrated in FIG. 2a, for use with a speaker 57a, as illustrated in FIG. 3, that may be coupled with a processor (not shown) for providing audible navigation instructions.

The rear, box-shaped section 40a is attached to a rear face 58a of the front section 38a and houses a navigation component (not shown), the processor (not shown), and a memory (not shown), although a processor (not shown) and a memory (not shown) of the vehicle may alternatively be connected to the navigational device 10a. The housing 30a of the navigational device 10a is preferably approximately six inches wide, four inches high, and five inches deep, although the width may range between two inches and twelve inches, the height may range between two inches and twelve inches, and the depth may range between two inches and twelve inches.

Figure 4:
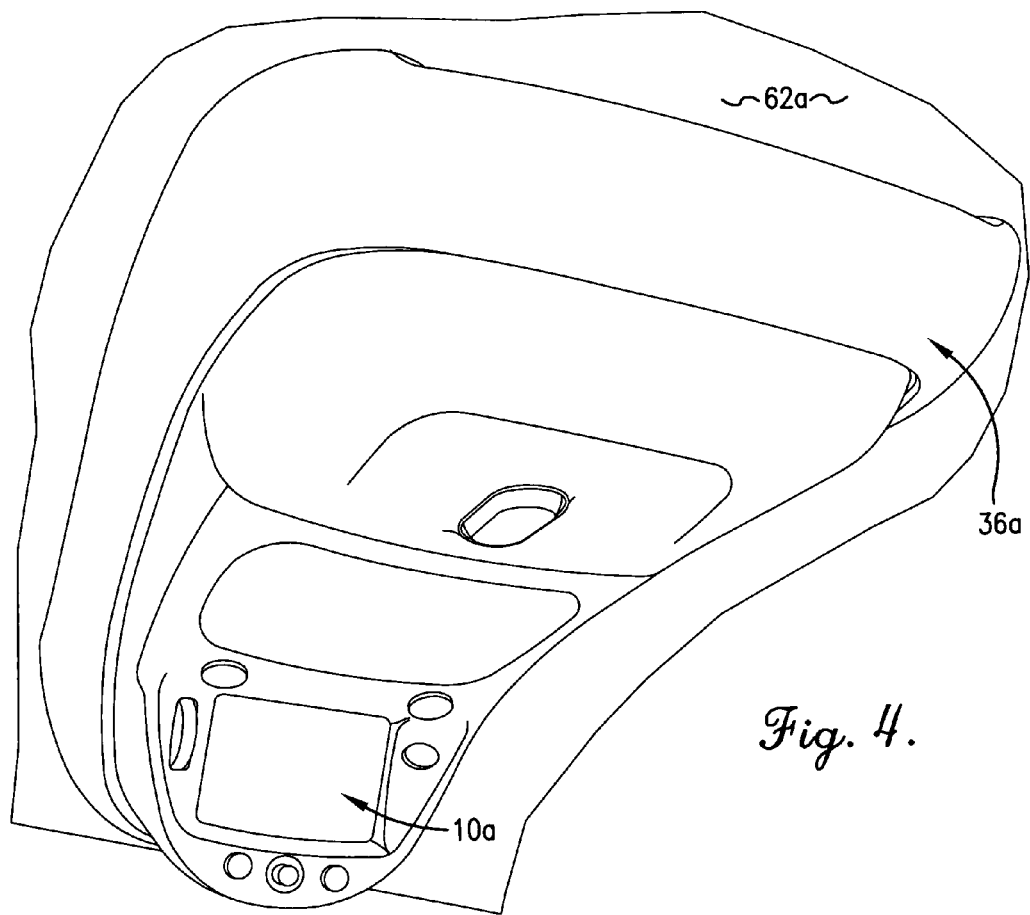
FIG. 4 is fragmentary isometric view of an alternative shape and size of the overhead console and the navigational device installed in the overhead console.
Figure 5:
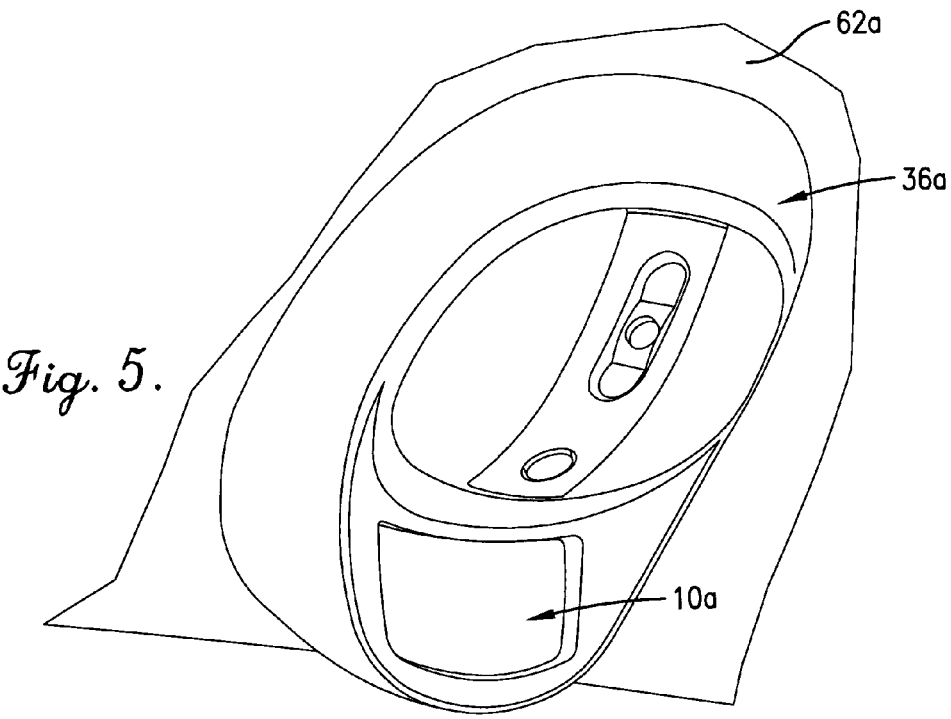
FIG. 5 is a fragmentary isometric view of a further alternative shape and size of the overhead console and the navigational device installed in the overhead console.

The overhead console 36a is any standard overhead console formed during manufacture of the vehicle, generally positioned on an interior roof section of the vehicle, and containing at least one non-navigation component 18a. The overhead console 36a generally comprises a main body 60a formed to fit with and be secured within an open area 62a of the vehicle, such as the interior roof section. The overhead console 36a is preferably within reach and within view of both a driver and a passenger of the vehicle. Additionally, the overhead console 36a is preferably positioned so as to not obstruct the driver's view in a rearview mirror. The overhead console's 36a shape and size will be unique to the make and model of each vehicle, as also illustrated in FIGS. 2a, 4, and 5.

To retrofit the vehicle with the first preferred embodiment of the present invention, the non-navigational component 18a is first removed from the overhead console 36a, as illustrated in FIG. 2a. Removal of the non-navigational component 18a results in the open port 12a. The navigational device 10a is then installed in the open port 12a of the overhead console 36a, as also illustrated in FIG. 2a. The navigational device 10a is importantly sized and configured to fit substantially within the open port 12a of the overhead console 36a. A front face of the navigational device 10a is preferably positioned generally flush with a face of the open port 12a, as also illustrated in FIGS. 4 and 5.

In an alternative of the first preferred embodiment, the overhead console 36a is entirely removed from the open area 62a, as illustrated in FIG. 2a, and a replacement overhead console 64a including the navigational device 10a is installed in the open area 62a, as illustrated in FIG. 2b. In this alternative, the overhead console 36a illustrated in FIG. 2a is formed during manufacture of the vehicle and does not originally include the navigational device 10a. The replacement overhead console 64a, as illustrated in FIG. 2b, may be substantially similar in shape and size, although not necessarily identical, to the overhead console 36a illustrated in FIG. 2a, but for differences necessary to accommodate the navigational device 10a. The replacement overhead console 64a, as illustrated in FIG. 2b, is then mounted within the open area 62a. The replacement overhead console 64a may include at least one non-navigational component 18a. Since the replacement overhead console 64a is formed after manufacture of the vehicle and includes the navigational device 10a, then the replacement overhead console 64a will necessarily not include at least one non-navigational component 18a that was included in the overhead console 36a. Alternatively, the non-navigational component 18a may be combined with the navigational device 10a, such that the replacement overhead console 64a includes all non-navigational components 18a that were included in the overhead console 36a, as discussed in more detail below. In a further alternative, two or more non-navigational components 18a from the overhead console 36a may be combined with regard to space such that the replacement overhead console 64a includes all non-navigational components 18a that were included in the overhead console 36a.

The navigational device 10a may also be connected to a power source (not shown) of the removed non-navigational component 18a. If the power source is supplied by the vehicle, then any wires 66a associated with the removed non-navigational component 18a, as illustrated in FIGS. 2a and 3, are connected to the newly installed navigational device 10a, as illustrated in FIG. 3. The navigational device 10a may include wires or other adapters 68a configured to connect with the existing wires 66a that were previously connected to the non-navigational component 18a. Alternatively, the navigational device 10a may include wires or other adapters 68a configured to connect directly with the power source supplied by the vehicle.

Further, the navigational device 10a may be connected to an information source (not shown) of the vehicle. For example, if the removed non-navigational component 18a was operable to display information about the vehicle, as illustrated in FIG. 2a, such as the outside temperature, the inside temperature of the vehicle, the vehicle's mileage, the vehicle's speed, the direction in which the vehicle is traveling, and the amount of mileage remaining based on the vehicle's power source, then the newly installed navigational device 10*a* may be connected to the information source of the non-navigational component 18*a*. The navigational device 10*a* is then operable to display the information formerly displayed by the non-navigational component 18*a*, in conjunction with displaying navigational information.

FIGS. 6-9 illustrate a navigational device 10*b* in accordance with a second preferred embodiment, which includes a housing 30*b* sized and configured to fit within an open port 12*b* resulting from removal of an air vent unit 70*b* from a vehicle. As with the first preferred embodiment, the size and shape of the open port 12*b* will be unique to the make and model of the vehicle, and thus, the second preferred embodiment provides for a plurality of shapes and sizes of navigational devices 10*b*.

Figure 6:
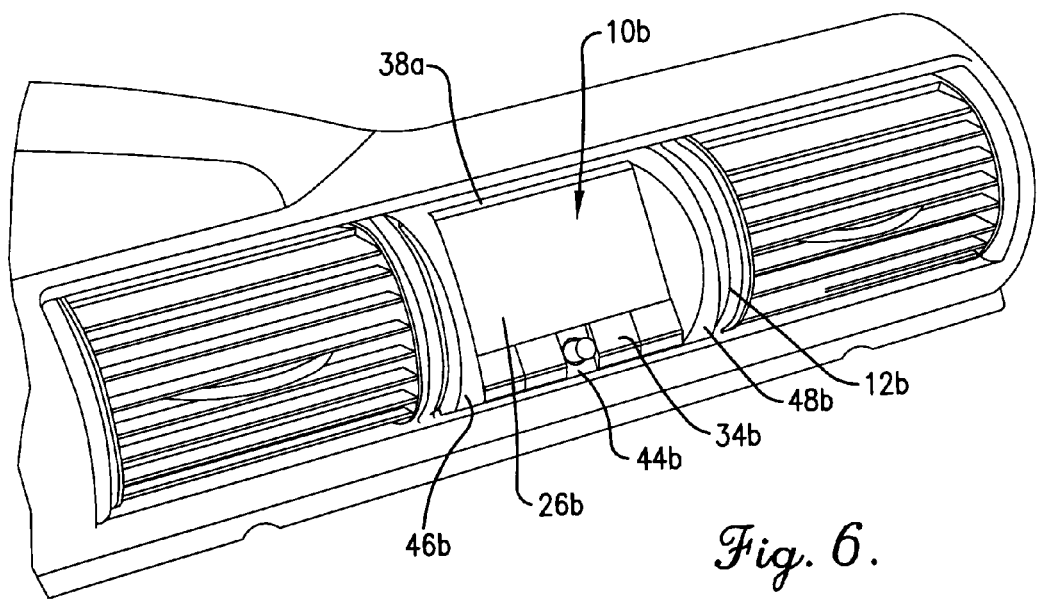
FIG. 6 is a fragmentary isometric view of the second preferred embodiment of the present invention illustrating a navigational device installed in an open port resulting from removal of a vehicle air vent unit.
Figure 7:
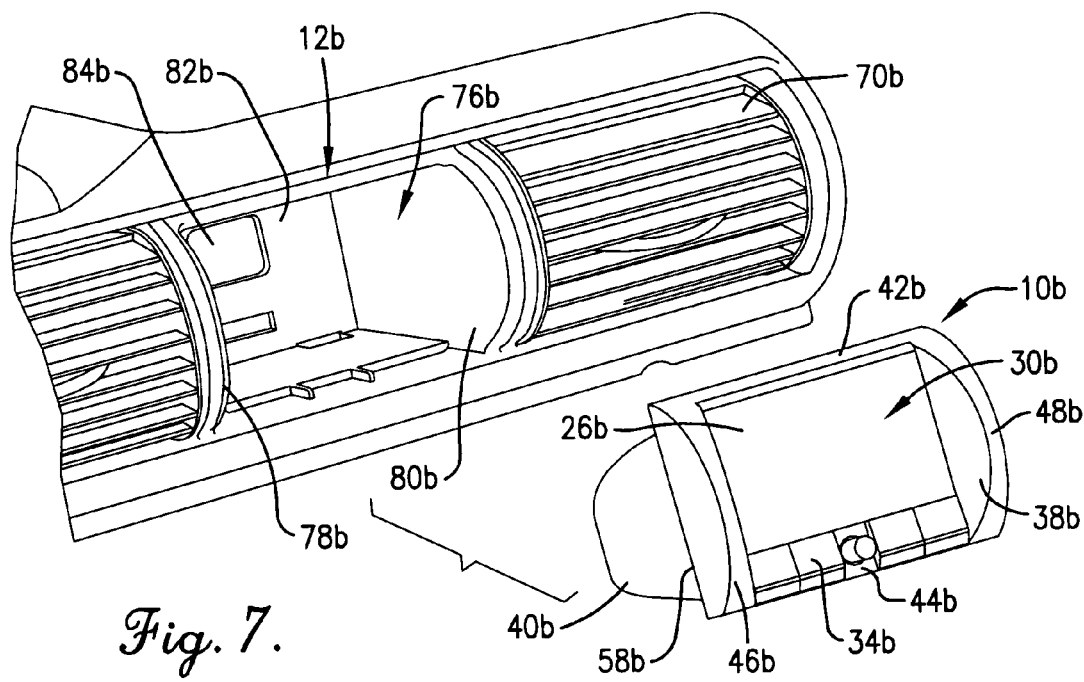
FIG. 7 is an exploded fragmentary isometric view of the navigational device and the open port of FIG. 6, particularly illustrating a first mounting unit for permanently mounting the navigational device in the open port.

As illustrated in FIGS. 6 and 7, the housing 30*b* is preferably approximately six inches wide, four inches high, and five inches deep, although the width may range between two inches and twelve inches, the height may range between two inches and twelve inches, and the depth may range between two inches and twelve inches. Similar to the first embodiment, the housing 30*b* includes a front, frame-shaped section 38*b* and an attached rear, box-shaped section 40*b*. The front section 38*b* includes upper and lower walls 42*b*,44*b* and left and right side walls 46*b*,48*b* which together define an enclosed area for receiving a display 26*b*. Control buttons 34*b* are positioned on the lower wall 44*b*. The left and right side walls 46*b*,48*b* are generally arcuate when viewed from a side and preferably project outwards from the display 26*b* so as to match the contours of the open port 12*b*.

The rear section 40*b* is attached to a rear face 58*b* of the front section 38*b* and houses a navigation component (not shown), a processor (not shown), and a memory (not shown). To facilitate the navigational device 10*b* fitting within the open port 12*b*, the rear section 40*b* of the housing 30*b* may be minimized. As illustrated in FIG. 7, the rear section 40*b* of the housing 30*b* tapers to a smaller size relative to an area of the front section 38*b* of the housing 30*b*, which allows the housing 30*b* to fit within relatively small open ports 12*b*.

Figure 8:
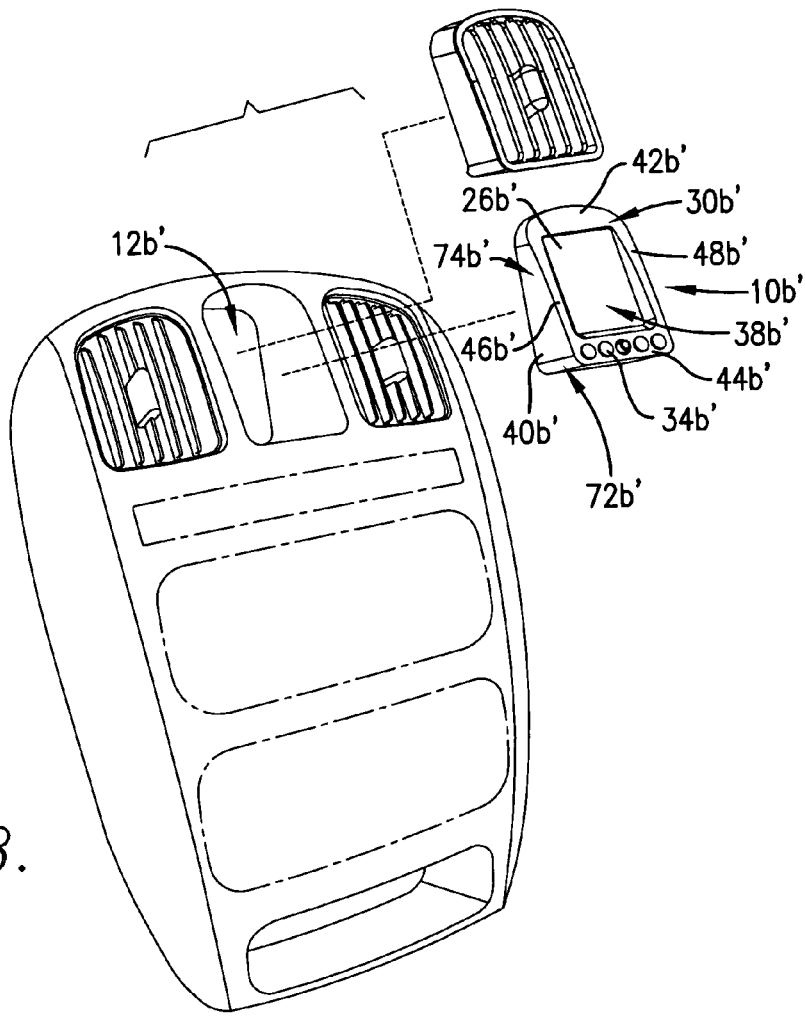
FIG. 8 is an exploded isometric view of the second preferred embodiment of the present invention, particularly illustrating removal of the air vent unit and insertion of the navigational device, wherein the navigational device is sized and configured to fit snugly within the open port.
Figure 9:
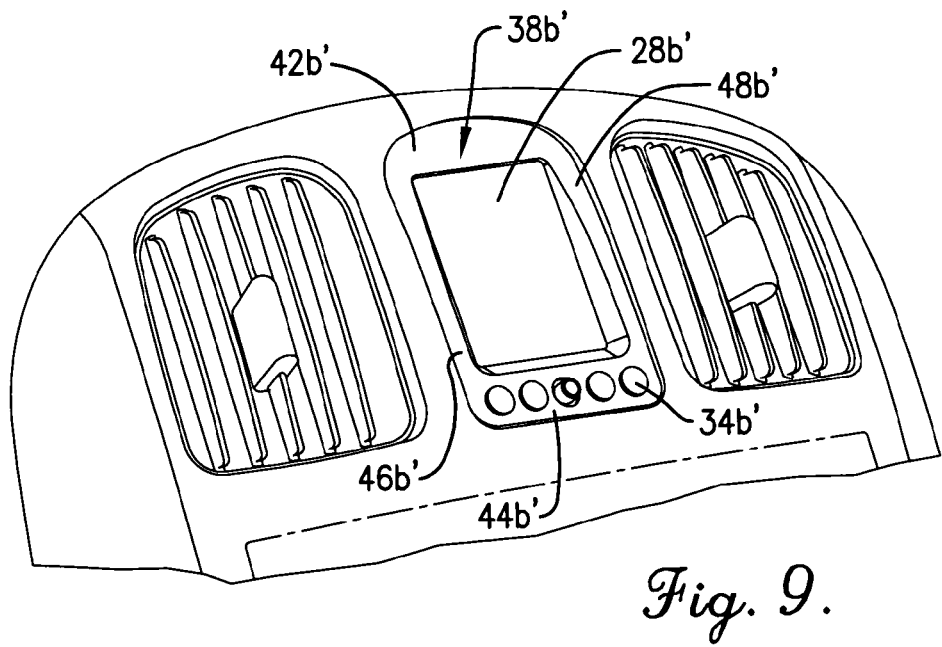
FIG. 9 is a fragmentary isometric view of the navigational device as illustrated in FIG. 8 inserted within the open port.

An alternative housing shape 30*b*' is illustrated in FIG. 8. As noted above, various open port 12*b* shapes and sizes necessitate various housing 30*b* shapes and sizes. As such, the housing 30*b*' illustrated in FIG. 8 preferably includes a front section 38*b*' and a rear section 40*b*'. The front section 38*b*' includes upper and lower walls 42*b*',44*b*' and left and right side walls 46*b*',48*b*', which together define an enclosed area for receiving a display 26*b*'. The upper wall 42*b*' is preferably arcuate so as to conform to the shape of an open port 12*b*'. Control buttons 34*b*' are preferably positioned on the lower wall 44*b*'. The rear section 40*b*' is preferably angled or sloped relative to the front section 38*b*' to better conform to the contours of the open port 12*b*' and to better position a navigational device 10*b*' at an optimal viewing angle. Additionally, the housing 30*b*' is preferably deeper at a lower end 72*b*' of the housing 30*b*' relative to an upper end 74*b*' of the housing 30*b*'. When positioned in the open port 12*b*', the front section 38*b*' of the housing 30*b*' is preferably flush with a face of the open port 12*b*', as illustrated in FIG. 9.

To install the navigational device 10*b* in the open port 12*b*, the second preferred embodiment provides for the navigational device 10*b* to fit within a first mounting unit 76*b* sized and configured to fit substantially within the open port 12*b*, as illustrated in FIGS. 6 and 7. The first mounting unit 76*b* is preferably adapted to permanently receive the navigational device 10*b*. The navigational device 10*b* is sized and configured to fit within the first mounting unit 76*b* and may be secured within the first mounting unit 76*b* using any conventional securing means, such as screws, brackets, adhesive, or other suitable methods. Alternatively, the navigational device 10*b* may be sized and configured to mount within the open port 12*b* resulting from removal of the air vent unit 70*b* without need for the first mounting unit 76*b*, as discussed in more detail below, and as illustrated in FIGS. 8 and 9.

The first mounting unit 76*b* is preferably box-shaped and includes left and right side walls 78*b*,80*b* and a rear wall 82*b*. The rear wall 82*b* is preferably provided with at least one opening 84*b*, as illustrated in FIG. 7. As with the first preferred embodiment, the navigational device 10*b* may include at least one wire or other adapter (not shown) mounted on the rear section 40*b* of the navigational device 10*b* for connecting the navigational device 10*b* to the power source (not shown) supplied by the vehicle. The wire on the navigational device 10*b* may then be inserted through the opening 84*b* in the rear wall 82*b* of the first mounting unit 76*b*.

The housing 30*b* of the navigational device 10*b* also preferably includes a first securing mechanism (not shown) for permanently securing the navigational device 10*b* within the first mounting unit 76*b*. The first securing mechanism may be any conventional securing means, such as screws, latches, brackets, or a combination of securing features.

The housing 30*b* also preferably includes insulation (not shown) for protecting the navigational device 10*b* and items housed within the navigational device 10*b* from excessive temperatures due to the vehicle's heating and cooling system. The insulation may be a housing of increased thickness (not shown) to act as a barrier against the excessive temperatures, actual insulation provided within the housing 30*b*, or other suitable protecting means.

Further, to avoid potential air noise problems that may result from removal of the air vent unit 70*b*, an air grate or vent (not shown) may be placed around the front section 38*b* of the housing 30*b* of the navigational device 10*b*. The grate serves to position the air flow so as to minimize noise resulting from removal of the air vent unit 70*b*. The air grate or vent may also cover any portion of the open port 12*b* the navigational device 10*b* does not fill to enhance the aesthetics of the installed navigational device 10*b*.

Figure 10:
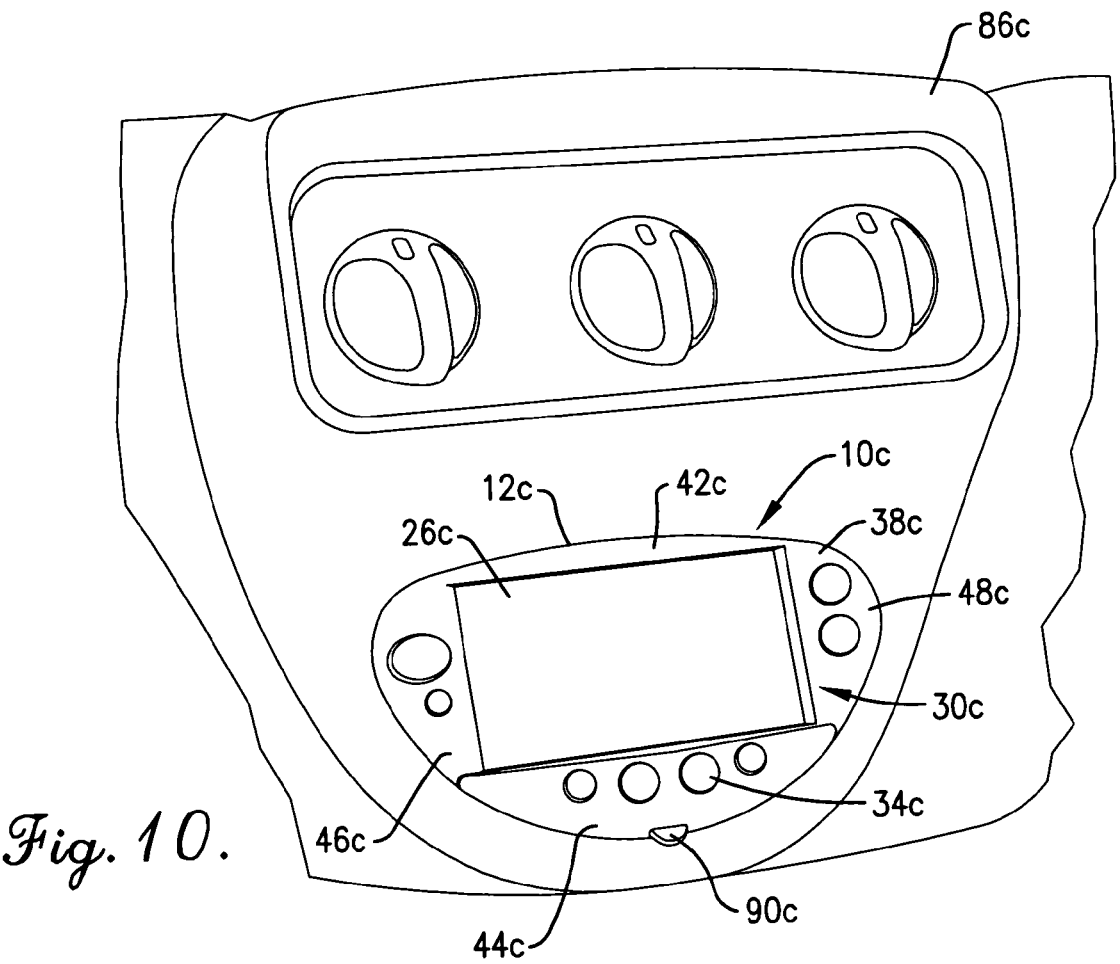
FIG. 10 is a fragmentary isometric view of the third preferred embodiment of the present invention particularly illustrating a navigational device mounted in a middle console of the vehicle.

In a third preferred embodiment, a navigational device 10*c* is sized and configured to fit within an open port 12*c* resulting from removal of a non-navigational component (not shown) in a middle console 86*c* of a vehicle, as illustrated in FIG. 10. The middle console 86*c* is preferably positioned directly under a dashboard (not shown) of the vehicle and generally center of the vehicle. In an alternative to the third preferred embodiment, the open port 12*c* may be positioned in the middle console 86*c* of the vehicle and result from removal of the air vent unit 70*b*, as illustrated in FIGS. 8 and 9.

Similar to previous embodiments, a housing 30*c* of the navigational device 10*c* is preferably approximately six inches wide, four inches high, and five inches deep, although the width may range between two inches and twelve inches, the height may range between two inches and twelve inches, and the depth may range between two inches and twelve inches. The housing 30*c* preferably includes a front section 38*c* and a rear section (not shown). The front section 38*c* is preferably curvilinear to conform to the contours of the open port 12*c*. The front section 38*c* includes upper and lower walls 42*c*,44*c* and left and right side walls 46*c*,48*c*, which together define an enclosed area for receiving a display 26*c*. Control buttons 34*c* are preferably positioned on the lower wall 44*c* and the left and right side walls 46*c*,48*c*. A grasping portion or tab 90*c* is preferably positioned on the lower wall 44*c* of the front section 38*c*, to remove the navigational device 10*c* from the open port 12*c*.

Once inserted in the open port 12c, the front section 38c of the housing 30c is preferably flush with a face of the open port 12c, as illustrated in FIG. 10. The rear section (not shown) is attached to a rear face (not shown) of the front section 38c and houses a navigation component (not shown), processor (not shown), and memory (not shown), although a processor (not shown) and a memory (not shown) of the vehicle may alternatively be connected to the navigational device 10c.

In a fourth preferred embodiment, a navigational device 10d is sized and configured to fit within an open port 12d resulting from removal of a non-navigational component (not shown) in a dashboard 88d of a vehicle, as illustrated in FIGS. 11 and 12. The dashboard 88d preferably extends a width of the vehicle, and the navigational device 10d may be installed at any location within the dashboard 88d, including to a left of a steering wheel (not shown) of the vehicle. In an alternative to the fourth preferred embodiment, the open port 12d may be positioned in the dashboard 88d of the vehicle and result from removal of an air vent unit (not shown).

Similar to previous embodiments, a housing 30d of the navigational device 10d is preferably approximately six inches wide, four inches high, and five inches deep, although the width may range between two inches and twelve inches, the height may range between two inches and twelve inches, and the depth may range between two inches and twelve inches. The housing 30d preferably includes a front section 38d and a rear section 40d. The front section 38d is generally rectangularly-shaped and includes upper and lower walls 42d,44d and left and right side walls 46d,48d, which together define an enclosed area for receiving a display 26d.

The rear section 40d is preferably attached to a rear face 58d of the front section 38d. Similar to the second preferred embodiment, the rear section 40d of the housing 30d is preferably minimized to facilitate mounting within the open port 12d. A navigation component (not shown), processor (not shown), and memory (not shown) are preferably stored in the rear section 40d. As illustrated in FIG. 11, the navigational device 10d is configured to removably mount within the open port 12d, as will be described below. Once mounted in the open port 12d, the front section 38d of the housing 30d preferably extends beyond a face of the open port 12d, as illustrated in FIG. 12. Additionally, an area of a vertical cross-section of the front section 38d may be larger than an area of the face of the open port 12d to prevent the navigational device 10d from sliding too far into the open port 12d, as also illustrated in FIG. 2.

Figure 13:
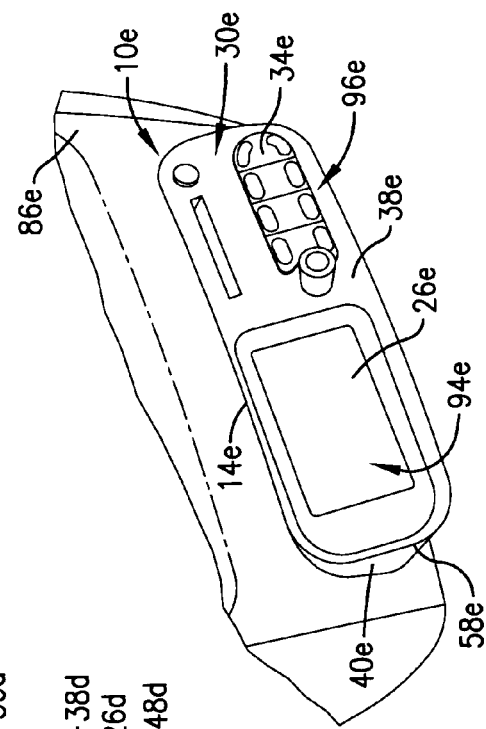
FIG. 13 is a fragmentary isometric view of the fifth preferred embodiment of the present invention, particularly illustrating a navigational device inserted within an empty recess originally empty.

In the first through fourth embodiments, a navigational device is sized and configured to mount within an open port resulting from removal of a non-navigational component. In a fifth preferred embodiment, a navigational device 10e is sized and configured to fit within an empty recess 14e formed during manufacture of a vehicle, as illustrated in FIG. 13 and as exemplarily illustrated in FIG. 16. The empty recess 14e may have been provided in the vehicle for holding objects such as eyeglasses, compact discs, a compact disc player, a garage door opener, or other miscellaneous articles. As illustrated in FIG. 13, the empty recess 14e may be located in a middle console 86e of the vehicle. Alternatively, the empty recess 14e may be located in an overhead console (not shown) or a dashboard (not shown) of the vehicle.

A housing 30e of the navigational device 10e is preferably approximately nine inches wide, four inches high, and six inches deep, although the width may range between two inches and sixteen inches, the height may range between two inches and twelve inches, and the depth may range between two inches and sixteen inches. The housing 30e preferably includes a front section 38e and a rear section 40e. As illustrated in FIG. 13, a display 26e is preferably located on a left side 94e of the front section 38e, and control buttons 34e are preferably located on a right side 96e of the front section 38e. The rear section 40e is preferably attached to a rear face 58e of the front section 38e. Depending on the location of the empty recess within the vehicle, the rear section 40e of the housing 30e need not be completely inserted in the empty recess 14e, as illustrated in FIG. 13. Instead, the navigational device 10e may be mounted within the empty recess 14e as necessitated by an optimal viewing angle.

In a sixth preferred embodiment, a navigational device 10f is sized and configured to fit within a hollowed receptacle 16f that is mounted in a vehicle. The hollowed receptacle 16f may, for example, be on a pillar 98f of a door frame of the vehicle, as illustrated in FIG. 14. The pillar 98f is preferably on a driver's side of the vehicle so that the navigational device 10f may be used by the driver of the vehicle. The pillar 98f, known in the art as an A-pillar, is the main supporting structure of the vehicle's door. The pillar 98f is preferably covered with rigid plastic or other suitable material that matches the color of an interior of the vehicle for aesthetic purposes.

A housing 30f of the navigational device 10f is preferably approximately four inches wide, four inches high, and eight inches deep, although the width may range between two inches and twelve inches, the height may range between two inches and twelve inches, and the depth may range between two inches and sixteen inches. The housing 30f is preferably oblong in shape and includes a front section 38f and a rear section (not shown). The front section 38f is preferably generally circularly-shaped. Similar to the previous embodiments, the rear section is secured to a rear face (not shown) of the front section 38f. A navigation component (not shown), processor (not shown), and memory (not shown) are preferably stored in the rear section.

To retrofit the pillar 98f with the navigational device 10f, the hollowed receptacle 16f is secured to the pillar 98f by conventional securing means, such as screws. The receptacle 16f is preferably generally oblong in shape to match the shape of the rear section (not shown) of the housing 30f. Other receptacle shapes may be used, such as spherical or cuboidal. The receptacle 16f has a face that is generally circular in shape, although the face may be differently shaped depending on the shape of the receptacle 16f and the housing 30f. The receptacle 16f is preferably positioned on the pillar 98f for easy viewing by a driver of the vehicle. The navigational device 10f is sized and configured to fit and mount within the hollowed receptacle 16f. Similar to previous embodiments, the navigational device 10f may be configured to connect to an information source (not shown) of the vehicle or a power source (not shown) supplied by the vehicle. Additionally, the navigational device 10f may be permanently or removably installed in the receptacle 16f, as discussed in more detail below.

Alternatively, as with the first embodiment, the pillar 98f may be removed and a replacement pillar (not shown) having the receptacle 16f and navigational device 10f secured thereto may be installed on the vehicle's door frame. The replacement pillar preferably has substantially the same shape, size, and color as the original pillar 98f, other than the inclusion of the receptacle 16f and navigational device 10f. In this alternative, the receptacle 16f is preferably integrally formed with the replacement pillar.

Figure 17:
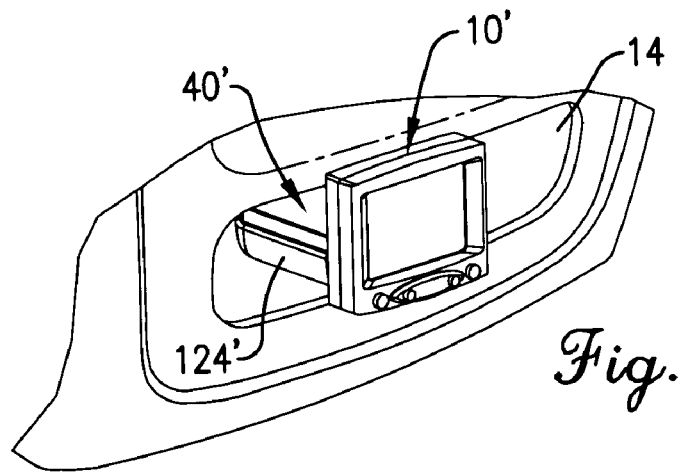
FIG. 17 is a fragmentary isometric view of the navigational device as illustrated in FIG. 16 removably mounted within the open port.

In all of the embodiments discussed above, the navigational device 10 may also be adapted to be removably mounted in the vehicle. As such, the navigational device 10 is configured to be removably mounted to a dashboard 88 of the vehicle, as illustrated in FIGS. 15 and 18, or within the open port 12, empty recess 14, or hollowed receptacle 16, as illustrated in FIGS. 16 and 17. Further, the navigational device 10 may be transferred between the dashboard 88 and the open port 12, empty recess 14, or hollowed receptacle 16. Further yet, the navigational device 10 may be removably mounted to a second vehicle, so that only one navigational device 10 need be used for multiple vehicles.

As illustrated in FIG. 15, the navigational device 10 is removably mounted to the dashboard 88 of the vehicle using a second mounting unit 100. The second mounting unit 100 includes a base 102 and a second securing mechanism 104. The base 102 is removably secured to the dashboard 88 of the vehicle using a vacuum lock 106. The base 102 is preferably generally circularly-shaped, and a circumference of the base 102 is partially surrounded by an overhanging flange 108. The base 102 is provided with a plurality of serrated teeth 110, the purpose of which will be described below.

The second securing mechanism 104 is secured to a rear section 40 of the housing 30 of the navigational device 10, as illustrated in FIG. 15, although the second securing mechanism 104 may be secured elsewhere on the housing 30. The second securing mechanism 104 is preferably circularly-shaped and includes first and second platforms 112,114. The navigational device 10 is preferably attached to the first platform 112, and the first platform 112 is preferably secured to the second platform 114. The first platform 112 is of a slightly smaller circumference than the second platform 114, such that the second platform 114 overhangs the first platform 112. This overhang leaves a rim 116 which can be guided into the overhanging flange 108 of the base 102 for securing the second securing mechanism 104 to the base 102, and thus, the navigational device 10 to the dashboard 88.

The second platform 114 is preferably provided with a plurality of serrated teeth 118 positioned around the second platform's 114 360° circumference. The serrated teeth 118 on the second platform 114 preferably have a pitch equivalent to a pitch of the serrated teeth 110 on the base 102. Once the rim 116 on the second platform 114 is guided into the overhanging flange 108, the serrated teeth 118 on the second platform 114 may be locked with the serrated teeth 110 on the base 102. The combined second securing mechanism 104 and navigational device 10 are then operable to rotate within the base 102 for moving the navigational device 10 to a plurality of desired viewing positions.

The navigational device 10 is preferably sized and configured to also mount or slide within the open port 12, empty recess 14, or hollowed receptacle 16 of the vehicle, as noted above with respect to the fourth preferred embodiment and the open port 12d. The navigational device 10 may also be mounted within the second vehicle in a substantially similar method as described above with respect to the original vehicle. For example, the navigational device 10 may be mounted on a dashboard of the second vehicle or in an open port, empty recess, or hollowed receptacle, wherein the dashboard and open port, empty recess, or hollowed receptacle of the second vehicle are substantially similar to the dashboard 88 and open port 12, empty recess 14, and hollowed receptacle 16 of the original vehicle.

An alternative third mounting unit 120' is illustrated in FIG. 18. The third mounting unit 120' is similar to the second mounting unit 100 in that includes a substantially similar base 102' and second securing mechanism 104'. Using the third mounting unit 120', a navigational device 10', substantially similar to the navigational device 10d of the fourth preferred embodiment, may be mounted to a dashboard 88' of the vehicle. Alternatively, the navigational device 10' may be removably mounted within the open port 12, empty recess 14, or hollowed receptacle 16 or transferred to and mounted within the second vehicle. In addition to the base 102' and second securing mechanism 104', the third mounting unit 120' also includes a pedestal 122' and a cradle 124', as illustrated in FIG. 18. When mounting the navigational device 10' on the dashboard 88' of the vehicle, the pedestal 122' is secured to a first platform 112' of the second securing mechanism 104', and the cradle 124' is secured to the pedestal 122'. The pedestal 122' raises the viewing height of the navigational device 10'. The pedestal 122' includes a turning lock 126' that is operable to tilt the navigational device 10' to a preferred viewing angle.

The cradle 124' is preferably generally U-shaped in cross section and has a width to accommodate a width of the navigational device 10'. As illustrated in FIG. 16, the cradle 124' preferably has a base wall 128' which is surrounded by a rear wall 130' and two side walls 132', all three of which are upstanding relative to the base wall 128'. The side walls 132' are each preferably provided with a flange 134', the purpose of which is described below. To secure the navigational device 10' within the cradle 124', the flanges 134' of the cradle 124' are inserted into a pair of recessed channels 136' provided on a rear section 40' of a housing 30' of the navigational device 10'. The rear wall 130' of the cradle 124' prevents the navigational device 10' from excessive sliding.

The cradle 124' may be mounted within any type of open port 12, empty recess 14, or hollowed receptacle 16 including the open port 12a formed from removal of the non-navigational component 30a in the overhead console 36a, the open port 12b formed from removal of the air vent unit 70b, the open port 12c formed from removal of the non-navigational component (not shown) in the middle console 86c, the open port 12d formed from removal of the non-navigational component (not shown) in the dashboard 88d, the empty recess 14e formed during manufacture of the vehicle and originally empty, or the hollowed receptacle 16f secured on the pillar 98f of the door frame. The cradle 124' may be secured within the open port 12, empty recess 14, or hollowed receptacle 16 by any conventional securing means, such as screws, adhesive, etc.

In a yet further alternative, the navigational device 10 may be sized and configured to be removably installed within the open port 12, empty recess 14, or hollowed receptacle 16 by simply inserting the navigational device 10 into the open port 12, empty recess 14, or hollowed receptacle 16 without need for any mounting unit 76b,100,120'. As exemplarily illustrated in FIGS. 8 and 9, the housing 30b of the navigational device 10b is dimensioned to fit snugly within the open port 12b. The housing 30b is large enough that the navigational device 10b will not fall through or slide too far into the open port 12b, yet the housing 30b is small enough that a user need not force or push the navigational device 10b into the open port 12b. As exemplarily illustrated in FIG. 10 and as noted above, the user may remove the navigational device 10c from the open port 12c by pulling the grasping portion or tab 90c on the front section 38c of the housing 30c.

Since the navigational device 10 may be removably mounted within the vehicle, it may not be convenient to connect the navigational device 10 to the power source (not shown) supplied by the vehicle and positioned within the overhead console 36a, middle console 86c, or dashboard 88d of the vehicle each time the navigational device 10 is mounted or installed in the vehicle. Therefore, the navigational device 10 may be provided with an internal power source (not shown), such as at least one battery, to provide power to the navigational device 10. Alternatively, the navigational device 10 may be connected to the power source supplied by the vehicle, wherein the power source is externally accessible on the middle console 86*c* or dashboard 88*d* of the vehicle.

Seventh and eighth preferred embodiments are disclosed in U.S. application Ser. No. 10/411,821, filed Apr. 11, 2003, and incorporated herein by reference. Ninth and tenth preferred embodiments are disclosed in U.S. application Ser. No. 10/633,044 filed Sep. 12, 2003, which is also incorporated herein by reference.

In an eleventh preferred embodiment of the present invention, illustrated in FIGS. 19-22, a navigation assembly 177*k* for locating a conventional, portable navigational device 10*k* in a vehicle is provided. The eleventh preferred embodiment is substantially similar to the sixth preferred embodiment in that the eleventh preferred embodiment provides a new location for mounting the navigational device 10*k* in the vehicle, wherein the new location was not formed during manufacture of the vehicle and does not result from removal of a non-navigational component 18. Unlike the sixth preferred embodiment, however, the eleventh preferred embodiment uses the conventional, portable navigational device 10*k* that is not particularly sized and configured to the contours and dimensions of an existing port 12 or empty recess 14 in the vehicle. Instead, the eleventh embodiment creates a receptacle that is sized and configured to receive a conventionally sized navigational device. An example of the conventional, portable navigational device 10*k* for the eleventh preferred embodiment is the GARMIN Pilot 650 manufactured by Garmin International, Inc.

The navigation assembly 177*k* of the eleventh preferred embodiment generally comprises the navigational device 10*k* and a mounting assembly 194*k* sized and configured to receive the navigational device 10*k*. The mounting assembly 194*k* is preferably secured to trim or molding 196*k* provided along an upper support bar or pillar 98*k* of the vehicle adjacent to a windshield, as illustrated in FIG. 19. The trim 196*k* is usually hard plastic or other similar material and can often be easily removed, as illustrated in FIG. 20. The eleventh preferred embodiment provides for replacement of the existing trim 196*k* installed during manufacture of the vehicle with substantially similar new trim 196*k*, except that the new trim 196*k* includes the mounting assembly 194*k* secured thereto or integrally formed therewith. As illustrated in FIG. 21, the newly-installed trim 196*k* having the mounting assembly 194*k* secured thereto preferably looks substantially similar to the original trim 196*k* installed during manufacture of the vehicle, so as to not affect the aesthetic qualities of the trim 196*k*. Alternatively, the mounting assembly 194*k* may be secured to the original trim 196*k* installed during manufacture of the vehicle, without need for replacing that trim 196*k* entirely.

As illustrated in FIG. 22, the mounting assembly 194*k* preferably includes a base 198*k* which is formed or secured to the trim 196*k*, a docking station 200*k* which is sized and configured to mate with the base 198*k*, and a retractable face plate 202*k*. The base 198*k* is preferably secured to or fits snugly around the trim 196*k* and is approximately eight inches in length, four inches in height, and two inches in depth, although the length may range between four inches and twelve inches, the height may range between two inches and six inches, and the depth may range between one-half inch and four inches. The base 198*k* includes a generally oval cut-out 204*k*, the purpose of which will be described below. The base 198*k* also includes electrical connections 180*k* for connecting the navigational device 10*k* to a power source and a data source supplied by the vehicle.

The docking station 200*k* is preferably oval-shaped and sized and configured to fit within the oval cut-out of the base 198*k*. The docking station 200*k* preferably includes a securing mechanism (not shown) to secure the docking station 200*k* to the base 198*k*. For example, the securing mechanism may be a groove and detent mating system, a spring-loaded latch, or other suitable securing mechanism. The docking station 200*k* also preferably includes a quick-release latch 206*k* or suitable release mechanism for removing the navigational device 10*k* from the docking station 200*k*.

The docking station 200*k* includes a generally rectangularly-shaped cut-out 208*k* sized and configured to receive the navigational device 10*k*, as described in more detail below. The docking station 200*k* also includes a speaker 57*k* for providing audible navigation instructions when the navigational device 10*k* is mounted within the docking station 200*k*. The docking station 200*k* further includes a plurality of openings 210*k* for an antenna 32*k* of the navigational device 10*k*, as discussed below with respect to the navigational device 10*k*, and the electrical connections 180*k*.

The retractable face plate 202*k* is preferably spring loaded and generally rectangularly-shaped so as to substantially fit within the rectangularly-shaped cut-out 208*k* of the docking station 200*k*. The face plate 202*k* also includes a plurality of openings 212*k* corresponding with the plurality of openings 210*k* in the docking station 200*k* for the antenna 32*k* and the electrical connections 180*k*. In operation, when the navigational device 10*k* is loaded or mounted into the docking station 200*k*, the retractable face plate 202*k* will retract generally flush with a rear face 214*k* of the docking station 200*k*. When the navigational device 10*k* is removed from the docking station 200*k*, the retractable face plate 202*k* extends forward, such that the plate 202*k* is generally flush with a front face 216*k* of the docking station 200*k*. The retractable face plate's purpose is to cover the rectangularly-shaped cut-out 208*k* of the docking station 200*k* and thus, is for general aesthetic purposes only.

The navigational device 10*k* of the eleventh preferred embodiment includes a navigation component, a navigation processor, a memory, and a housing 30*k*. The housing 30*k* is preferably sized and configured to fit within the rectangularly-shaped cut-out 208*k* in the docking station 200*k*. The housing 30*k* is preferably approximately six inches long, two inches wide, and four inches high, although the length may range between two inches and ten inches, the width may range between one-half inch and four inches, and the height may range between two inches and six inches. The housing 30*k* preferably includes a front section 38*k* and a rear section 40*k*. As also illustrated in FIG. 21, a display 26*k* is preferably located on a left side of the front section 38*k*, and control buttons 34*k* are preferably located on a right side of the front section 38*k*.

The rear section 40*k* of the housing 30*k* is preferably attached to a rear face 58*k* of the front section 38*k* and includes electrical connections (not shown in FIG. 22). The electrical connections are preferably positioned to mate with the electrical connections 180*k* on the base 198*k* via the docking station 200*k* so as to provide power and data transfer to the navigational device 10*k* from the power source and data source supplied by the vehicle. Alternatively, the navigational device 10*k* may include an internal power source, such as at least one battery cell, and an internal data source. Also similar to the ninth and tenth preferred embodiments, the navigational device 10*k* may be integrated with a display and/or speaker previously installed in the vehicle either during or after manufacture of the vehicle. Therefore, the navigational device 10*k* may include only the antenna 32*k*, the navigation component, the navigation processor, and the control buttons 34*k*.

The rear section 40k of the housing 30k is also provided with the antenna 32k for the navigational device 10k. As best illustrated in FIG. 22, the antenna 32k is preferably hinged to the rear section 40k. When a user of the navigational device 10k desires to position the device 10k within the docking station 200k, the user must pivot the antenna 32k upwardly and guide the antenna 32k through the correct openings 212k, 210k in the face plate 202k and docking station 200k. When the navigational device 10k is not positioned within the docking station 200k, the antenna 32k may be pivoted generally flush with the rear section 40k of the housing 30k.

When mounting the navigational device 10k in the docking station 200k, a user of the navigational device 10k guides the device 10k within the rectangularly-shaped cut-out 208k in the docking station 200k. The user applies pressure to bias the face plate 202k into the cut-out 208k and snap, latch, or lock the navigational device 10k in place. Once in position, the navigational device 10k is securely in position and cannot be removed without depressing the quick-release latch 206k on the docking station 200k. The navigational device 10k is then within easy viewing by a driver or passenger of the vehicle, and the control buttons 34k on the navigational device 10k are easily accessible. Advantageously, the navigational device 10k may be removed from the mounting assembly 194k for use in other locations if desired. Additionally, when the navigational device 10k is placed in the docking station 200k, the internal battery of the navigational device 10k is charged.

Although the invention has been described with reference to the preferred embodiment illustrated in the attached drawing figures, it is noted that equivalents may be employed and substitutions made herein without departing from the scope of the invention as recited in the claims. For example, the preferred embodiments may be combined to produce the navigational device 10 having various features. For example, the navigational device 10b may be removably mounted in the air vent unit 70b, or the navigational device 10b mounted in the air vent unit 70b may be operable to connect to the power source supplied by the vehicle. Additionally, a navigational device (not shown) sized and configured to fit within an open port (not shown) located elsewhere in the vehicle, such as in a rear seating area of a van, may be provided.

Further, as discussed above, the navigational device 10 is configured to be transferred between vehicles. As such, the navigational device 10 may be removably mounted in the vehicle using any mounting unit 76b,100,120', or the navigational device 10 may be sized and configured to fit within the open port 12, empty recess 14, or hollowed receptacle 16 of each vehicle, either using the mounting unit 120' or sizing the housing 30 of the navigational device 10 to fit snugly within the open port 12, empty recess 14, or hollowed receptacle 16.

Further yet, the navigational device 10 may also be permanently mounted in the open port 12, empty recess 14, or hollowed receptacle 16 using any conventional securing means (not shown), such as latches or screws.

Having thus described the preferred embodiment of the invention, what is claimed as new and desired to be protected by Letters Patent includes the following:

1. A navigation assembly for use in a vehicle not originally equipped with navigational capabilities, the navigation assembly comprising:
    a portable navigational device; and
    a mounting assembly for mounting within the vehicle and sized and configured to removably receive the navigational device, wherein the navigation device remains visible when received within the mounting assembly and is functional as a navigation device both when received within the mounting assembly and when being used independently of the mounting assembly,
    the mounting assembly including—
        a trim piece secured to the vehicle,
        a base secured to the trim,
        a docking station sized and configured to mate within the base via a securing mechanism, the docking station configured for removably docking with the navigation device, wherein the docking station is configured to electrically couple with the navigation device and includes a speaker for providing audible navigation instructions generated by the navigation device, and
        a retractable face plate mounted within the docking station and configured to retract when the navigation device is received within the docking station and extend when the navigation device is removed from the docking station, thereby covering the void left in the docking station.

2. The navigation assembly as claimed in claim 1, wherein the navigational device is designed to be used independently of the vehicle rather than being particularly sized and configured to fit an existing space within the vehicle.

3. The navigation assembly as claimed in claim 2, wherein the mounting assembly is adapted for mounting on a support pillar directly above the vehicle's windshield.

4. The navigation assembly as claimed in claim 1, the mounting assembly further including electrical connections for connecting the navigational device to a power source and a data source supplied by the vehicle.

5. The navigation assembly as claimed in claim 1, wherein the navigational device is a global positioning satellite device including—
    a navigation component,
    a processor coupled with the navigation component,
    a memory coupled with the processor,
    a display,
    an input, and
    a housing for housing the navigation component, the processor, and the memory.

6. The navigation assembly as claimed in claim 1, wherein the support pillar runs along and directly above the vehicle's windshield.

7. A navigation assembly for use in a vehicle not originally equipped with navigational capabilities, the navigation assembly comprising:
    a stand-alone hand-held portable navigational device; and
    a mounting assembly for mounting within the vehicle and configured to removably receive the navigational device, such that the navigation device remains visible and fully functional when received within the mounting assembly,
    the mounting assembly including—
        a base having a securing mechanism,
        a docking station sized and configured to mate within the base via the securing mechanism, the docking station configured for removably docking with the navigation device, wherein the docking station is configured to electrically couple with the navigation device and includes a speaker for providing audible navigation instructions generated by the navigation device, and
        a retractable face plate mounted within the docking station and configured to retract when the navigation device is received within the docking station and extend when the navigation device is removed from the docking station, thereby covering the void left in the docking station.

8. The navigation assembly as claimed in claim 7, wherein the navigational device is designed to be used independently of the vehicle rather than being particularly sized and configured to fit an existing space within the vehicle.

9. The navigation assembly as claimed in claim 7, wherein the mounting assembly is configured for mounting to a support pillar directly above the vehicle's windshield and which runs along the vehicle's windshield.

10. The navigation assembly as claimed in claim 7, wherein the mounting assembly includes electrical connections for connecting the navigational device to a power source and a data source supplied by the vehicle.

11. The navigation assembly as claimed in claim 7, wherein the navigational device is a global positioning satellite device including—
- a navigation component,
- a processor coupled with the navigation component,
- a memory coupled with the processor,
- a display,
- an input, and
- a housing for housing the navigation component, the processor, and the memory.

\* \* \* \* \*